(12) United States Patent
Zhou et al.

(10) Patent No.: US 12,483,552 B2
(45) Date of Patent: Nov. 25, 2025

(54) AUTHENTICATION WINDOW DISPLAY METHOD AND APPARATUS

(71) Applicant: Huawei Technologies Co., Ltd., Shenzhen (CN)

(72) Inventors: Xuan Zhou, Shenzhen (CN); Jie Xu, Shanghai (CN); Shoucheng Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 482 days.

(21) Appl. No.: 16/965,808

(22) PCT Filed: Jan. 26, 2019

(86) PCT No.: PCT/CN2019/073272
§ 371 (c)(1),
(2) Date: Jul. 29, 2020

(87) PCT Pub. No.: WO2019/144947
PCT Pub. Date: Aug. 1, 2019

(65) Prior Publication Data
US 2021/0051144 A1 Feb. 18, 2021

(30) Foreign Application Priority Data
Jan. 29, 2018 (CN) .......................... 201810081665.8

(51) Int. Cl.
*H04L 29/06* (2006.01)
*G06F 9/451* (2018.01)
(Continued)

(52) U.S. Cl.
CPC .......... *H04L 63/0861* (2013.01); *G06F 9/452* (2018.02); *G06V 40/1365* (2022.01); *H04L 63/0884* (2013.01)

(58) Field of Classification Search
None
See application file for complete search history.

(56) References Cited

U.S. PATENT DOCUMENTS 10,162,624 B1 * 12/2018 Moturu ............... G06F 9/45529
10,163,105 B1 * 12/2018 Ziraknejad ......... G06Q 20/3274
(Continued)

FOREIGN PATENT DOCUMENTS

| CN | 101350811 | * | 1/2009 |
| CN | 201639634 U | | 11/2010 |

(Continued)

*Primary Examiner* — Piotr Poltorak
(74) *Attorney, Agent, or Firm* — Conley Rose, P.C.

(57) ABSTRACT

An authentication window display method includes, after an authentication request sent by a third-party application is detected, obtaining authentication information from the third-party application, where the authentication information includes an authentication mode and first prompt information. The authentication window display method further includes determining a display location of a first authentication window based on a location of an authentication component corresponding to the authentication mode and the authentication mode, where the authentication component is configured to collect biological information of a user. The authentication window display method further includes displaying the first authentication window at the display location, where the first authentication window displays the first prompt information.

20 Claims, 20 Drawing Sheets

After an authentication request sent by a third-party application is detected, obtain authentication information from the third-party application, where the authentication information includes an authentication mode and first prompt information — 101

Determine a display location of a first authentication window based on a location of an authentication component corresponding to the authentication mode and the authentication mode, where the authentication component is configured to collect biological information of a user — 102

Display the first authentication window at the display location, where the first authentication window displays the first prompt information — 103

(51) Int. Cl.
*G06V 40/12* (2022.01)
*H04L 9/40* (2022.01)

(56) References Cited

U.S. PATENT DOCUMENTS

| | | | |
|---|---|---|---|
| 2006/0129629 A1* | 6/2006 | Kawashima | H04L 51/48 |
| | | | 709/203 |
| 2011/0138416 A1 | 6/2011 | Kang et al. | |
| 2012/0258773 A1* | 10/2012 | Alvarez Rivera | G06F 1/1656 |
| | | | 726/19 |
| 2014/0089857 A1* | 3/2014 | Wang | G06F 9/451 |
| | | | 715/835 |
| 2014/0101576 A1 | 4/2014 | Kwak et al. | |
| 2014/0112555 A1 | 4/2014 | Fadell et al. | |
| 2014/0198036 A1 | 7/2014 | Kim et al. | |
| 2014/0310624 A1* | 10/2014 | Peng | G06F 9/451 |
| | | | 715/765 |
| 2014/0375660 A1 | 12/2014 | Tamaki | |
| 2015/0106202 A1* | 4/2015 | Bastaldo-Tsampalis | |
| | | | G06Q 30/0257 |
| | | | 705/14.55 |
| 2015/0371073 A1 | 12/2015 | Cho et al. | |
| 2016/0227411 A1 | 8/2016 | Lundblade et al. | |
| 2016/0253670 A1 | 9/2016 | Kim et al. | |
| 2016/0350522 A1 | 12/2016 | Chi et al. | |
| 2017/0085388 A1 | 3/2017 | Fort et al. | |
| 2017/0103382 A1 | 4/2017 | Kim et al. | |
| 2017/0193272 A1* | 7/2017 | Kim | G06V 40/1347 |
| 2017/0193489 A1 | 7/2017 | Jeon | |
| 2017/0279957 A1 | 9/2017 | Abramson et al. | |
| 2018/0012007 A1 | 1/2018 | Kim et al. | |
| 2018/0025442 A1 | 1/2018 | Isaacson et al. | |
| 2018/0101297 A1* | 4/2018 | Yang | H04L 51/224 |
| 2018/0114010 A1* | 4/2018 | Van Os | G06Q 20/12 |
| 2018/0276356 A1 | 9/2018 | Kim | |
| 2018/0277065 A1 | 9/2018 | Zuo et al. | |
| 2019/0019048 A1 | 1/2019 | Deng et al. | |
| 2019/0065240 A1* | 2/2019 | Kong | G06F 3/04886 |
| 2020/0050360 A1* | 2/2020 | Jeon | G06V 10/147 |

FOREIGN PATENT DOCUMENTS

| | | | |
|---|---|---|---|
| CN | 102509053 A | | 6/2012 |
| CN | 105335724 A | | 2/2016 |
| CN | 105871913 A | | 8/2016 |
| CN | 106716431 A | | 5/2017 |
| CN | 107111763 A | | 8/2017 |
| CN | 107329688 A | | 11/2017 |
| CN | 107358439 A | | 11/2017 |
| CN | 107545167 A | | 1/2018 |
| CN | 107562356 A | | 1/2018 |
| EP | 3070631 A1 | | 9/2016 |
| JP | 2007328590 A | | 12/2007 |
| JP | 2015215793 A | | 12/2015 |
| JP | 2017138846 A | | 8/2017 |
| KR | 20040048048 | * | 6/2004 |
| KR | 20060119697 A | | 11/2006 |
| KR | 101513629 | * | 4/2015 |
| WO | 2015056844 A1 | | 4/2015 |
| WO | 2016201016 A1 | | 12/2016 |
| WO | 2017039036 A1 | | 3/2017 |
| WO | 2017157186 A1 | | 9/2017 |

* cited by examiner

AUTHENTICATION WINDOW DISPLAY METHOD AND APPARATUS

CROSS-REFERENCE TO RELATED APPLICATIONS

This application is a national stage application of International Patent Application No. PCT/CN2019/073272, filed on Jan. 26, 2019, which claims priority to Chinese Patent Application No. 201810081665.8, filed on Jan. 29, 2018. Both of the aforementioned applications are hereby incorporated by reference in their entireties.

TECHNICAL HELD

This application relates to the field of communications technologies, and specifically, to an authentication window display method and apparatus.

BACKGROUND

With development of science and technology, an increasing quantity of third-party applications need to use a biometric recognition technology to perform identity authentication, for example, perform system unlocking, payment authentication, or application login authentication.

In the prior art, when a third-party application performs identity authentication, the third-party application usually generates an authentication screen and an authentication window of the third-party application. To be specific, the third-party application determines specific content displayed on the authentication screen, a specific display location at which the authentication window is displayed on the authentication screen, or the like. In addition, different third-party applications may have different authentication windows and different display locations. However, hardware of a terminal is continuously innovated currently, so that a component in the terminal is deployed in increasingly diversified forms. Therefore, the authentication screen of the third-party application may conflict with a hardware form of the terminal. For example, in a bezel-less phone, a fingerprint sensor may be disposed at a specific location on a screen. When the third-party application prompts a user to perform fingerprint authentication on the authentication screen, the user cannot accurately learn of the location of the fingerprint sensor, and consequently the authentication fails.

SUMMARY

Embodiments of this application provide an authentication window display method and apparatus, so that a user can accurately learn of a location of an authentication component, thereby increasing an authentication success rate.

A first aspect of this application provides an authentication window display method, where the method is applied to a terminal, and includes:
 after an authentication request sent by a third-party application is detected, obtaining authentication information from the third-party application, where the authentication information includes an authentication mode and first prompt information;
 determining a display location of a first authentication window based on a location of an authentication component corresponding to the authentication mode and the authentication mode, where the authentication component is configured to collect biological information of a user; and
 displaying the first authentication window at the display location, where the first authentication window displays the first prompt information.

In this solution, the authentication mode includes all modes that can be used by the user to perform identity authentication, for example, a fingerprint authentication mode, a facial image authentication mode, and an iris authentication mode.

For each terminal, once a manner in which a component in the terminal is deployed is determined, the manner does not change. In this way, a location at which an authentication component in the terminal is deployed is fixed. Therefore, after obtaining the authentication mode, the terminal determines the display location of the first authentication window on a screen based on the location of the authentication component corresponding to the authentication mode and the authentication mode.

In the foregoing solution, after the authentication request sent by the third-party application is detected, the authentication mode is obtained from the third-party application, and the display location of the first authentication window is determined based on the location of the authentication component corresponding to the authentication mode. Therefore, the user can learn of the location of the authentication component, and perform identity authentication in the first authentication window by using the authentication component, so that an authentication success rate can be increased.

Optionally, the determining a display location of a first authentication window based on a location of an authentication component corresponding to the authentication mode and the authentication mode includes:
 determining the display location of the first authentication window based on the authentication mode and a preset correspondence, where the correspondence includes a relationship between the location of the authentication component corresponding to the authentication mode and the display location of the first authentication window.

In this solution, once a form in which each component in the terminal is deployed is determined, the form remains unchanged, and a location of each authentication component does not change after delivery. Therefore, the terminal may pre-store the correspondence between a location of the authentication component corresponding to the authentication mode and the display location of the first authentication window. After obtaining the authentication mode from the third-party application, the terminal may determine the display location of the first authentication window based on the pre-stored correspondence.

In the foregoing solution, the display location of the first authentication window is determined based on the authentication mode and the preset correspondence, so that the display location can be determined simply.

Optionally, the method further includes:
 detecting whether a second authentication window popped up by the third-party application is displayed on a display screen of the terminal, and
 if the second authentication window popped up by the third-party application is displayed on the display screen, adjusting the location and/or a size of the first authentication window, so that the adjusted first authentication window blocks the second authentication window.

In the foregoing solution, after detecting that the second authentication window popped up by the third-party application is displayed on the display screen, the terminal adjusts the location and/or the size of the first authentication window, so that the adjusted first authentication window can block the second authentication window. Therefore, the second authentication window popped up by the third-party application does not confuse the user, so that user experience can be improved.

Optionally, the method further includes:
  detecting whether a third authentication window popped up by the third-party application is displayed on a display screen of the terminal; and
  if the third authentication window popped up by the third-party application is displayed on the display screen, performing weakening processing on the third authentication window, where the weakening processing includes mask adding processing and/or fuzzy processing.

In the foregoing solution, after detecting that the third authentication window popped up by the third-party application is displayed on the display screen, the terminal performs weakening processing on the third authentication window. Therefore, the third authentication window popped up by the third-party application does not confuse the user, so that user experience can be improved.

Optionally, the method further includes:
  sending a notification message to the third-party application, where the notification message is used to notify the third-party application to forbid pop-up of an authentication window.

In this solution, when displaying the first authentication window on the display screen, the terminal may send the notification message to the third-party application, to notify the third-party application to forbid pop-up of the fourth authentication window. In other words, the third-party application pops up no authentication window on the display screen. In this case, only the first authentication window is displayed on the display screen of the terminal, and therefore the user is not confused, so that user experience can be improved.

Optionally, the method further includes:
  dynamically adjusting the size of the first authentication window based on the first prompt information.

In this solution, the terminal may dynamically adjust the size of the first authentication window based on the first prompt information, to display all content of the first prompt information in the first authentication window through plaintext. Therefore, the user can clearly view all the content of the first prompt information without a need of performing another operation, so that user experience can be improved.

Optionally, after the displaying the first authentication window at the display location, the method further includes:
  determining whether the first authentication window blocks other display information on the display screen than an authentication window popped up by the third-party application; and
  if the first authentication window blocks the other display information, displaying the other blocked display information in a display area other than the first authentication window.

In this solution, when determining that the first authentication window blocks the other display information on the display screen than the authentication window popped up by the third-party application, the terminal displays the other blocked display information in the display area than the first authentication window. Therefore, the user can clearly view all display information, so that user experience can be improved.

Optionally, after the displaying the first authentication window at the display location, the method further includes:
  receiving the biological information of the user that is collected by the authentication component;
  performing authentication on the biological information; and
  if the authentication fails, displaying second prompt information in the first authentication window, where the second prompt information is used to prompt the user that the authentication fails and/or prompt the user to enter the biological information again.

Optionally, the method further includes:
  if the authentication succeeds, jumping to an operation screen of the third-party application.

In the foregoing solution, after the authentication fails, the second prompt information is displayed in the first authentication window to prompt the user. Therefore, when the user enters the biological information again, the user can still learn of the location of the authentication component, and perform identity, authentication in the first authentication window by using the authentication component, so that an authentication success rate can be increased.

A second aspect of this application provides an authentication window display apparatus, including:
  an obtaining module, configured to: after an authentication request sent by a third-party application is detected, obtain authentication information from the third-party application, where the authentication information includes an authentication mode and first prompt information;
  a determining module, configured to determine a display location of a first authentication window based on a location of an authentication component corresponding to the authentication mode and the authentication mode, where the authentication component is configured to collect biological information of a user; and
  a display module, configured to display the first authentication window at the display location, where the first authentication window displays the first prompt information.

Optionally, the determining module is specifically configured to:
  determine the display location of the first authentication window based on the authentication mode and a preset correspondence, where the correspondence includes a relationship between the location of the authentication component corresponding to the authentication mode and the display location of the first authentication window.

Optionally, the apparatus further includes:
  a first detection module, configured to detect whether a second authentication window popped up by the third-party application is displayed on a display screen of the terminal; and
  a first adjustment module, configured to: when the first detection module detects that the second authentication window popped up by the third-party application is displayed on the display screen, adjust the location and/or a size of the first authentication window, so that the adjusted first authentication window blocks the second authentication window.

Optionally, the apparatus further includes:
a second detection module, configured to detect whether a third authentication window popped up by the third-party application is displayed on a display screen of the terminal; and
a processing module, configured to: when the second detection module detects that the third authentication window popped up by the third-party application is displayed on the display screen, perform weakening processing on the third authentication window, where the weakening processing includes mask adding processing or fuzzy processing.

Optionally, the apparatus further includes:
a sending module, configured to send a notification message to the third-party application, where the notification message is used to notify the third-party application to forbid pop-up of an authentication window.

Optionally, the apparatus further includes:
a second adjustment module, configured to dynamically adjust the size of the first authentication window based on the authentication content.

Optionally, the apparatus further includes:
a judging module, configured to determine whether the first authentication window blocks other display information on the display screen than an authentication window popped up by the third-party application.

The display module is further configured to: when the judging module determines that the first authentication window blocks the other display information, display the other blocked display information in a display area other than the first authentication window.

Optionally, the apparatus further includes:
a receiving module, configured to receive the biological information of the user that is collected by the authentication component; and
an authentication module, configured to perform authentication on the biological information.

The display module is further configured to: when the authentication performed by the authentication module fails, display second prompt information in the first authentication window, where the second prompt information is used to prompt the user that the authentication fails and/or prompt the user to enter the biological information again.

Optionally, the apparatus further includes:
a jumping module, configured to: if the authentication performed by the authentication module succeeds, jump to an operation screen of the third-party application.

A third aspect of this application provides a terminal, including:
a processor, configured to: in response to that an authentication request sent by a third-party application is detected, obtain authentication information from the third-party application, where the authentication information includes an authentication mode and first prompt information; and determine a display location of a first authentication window based on a location of an authentication component corresponding to the authentication mode and the authentication mode, where the authentication component is configured to collect biological information of a user; and
a display, configured to display the first authentication window at the display location, where the first authentication window displays the first prompt information.

Optionally, the processor is specifically configured to:
determine the display location of the first authentication window based on the authentication mode and a preset correspondence, where the correspondence includes a relationship between the location of the authentication component corresponding to the authentication mode and the display location of the first authentication window.

Optionally, the processor is further configured to:
detect whether a second authentication window popped up by the third-party application is displayed on a display screen of the terminal; and
if the second authentication window popped up by the third-party application s displayed on the display screen, adjust the location and/or a size of the first authentication window, so that the adjusted first authentication window blocks the second authentication window.

Optionally, the processor is further configured to:
determine whether a third authentication window popped up by the third-party application is displayed on a display screen of the terminal; and
if the third authentication window popped up by the third-party application is displayed on the display screen, perform weakening processing on the third authentication window, where the weakening processing includes mask adding processing or fuzzy processing.

Optionally, the processor is further configured to send a notification message to the third-party application, where the notification message is used to notify the third-party application to forbid pop-up of an authentication window.

Optionally, the processor is further configured to dynamically adjust the size of the first authentication window based on the authentication content.

Optionally, the processor is further configured to:
determine whether the first authentication window blocks other display information on the display screen than an authentication window popped up by the third-party application; and
if the first authentication window blocks the other display information, display the other blocked display information in a display area other than the first authentication window.

Optionally, the processor is further configured to: receive the biological information of the user that is collected by the authentication component; and perform authentication on the biological information.

The processor is further configured to: if the authentication fails, display second prompt information in the first authentication window; where the second prompt information is used to prompt the user that the authentication fails and/or prompt the user to enter the biological information again.

Optionally, the processor is further configured to: if the authentication succeeds, jump to an operation screen of the third-party application.

A fourth aspect of this application provides a chip, including a memory and a processor.

The memory is configured to store a program instruction.

The processor is configured to invoke the program instruction stored in the memory, to implement the following steps:
after an authentication request sent by a third-party application is detected, obtaining authentication information from the third-party application, where the authentication information includes an authentication mode and first prompt information;
determining a display location of a first authentication window based on a location of an authentication component corresponding to the authentication mode and the authentication mode, where the authentication component is configured to collect biological information of a user; and indicating a display connected to an electronic apparatus to display the first authentication window at the display location, where the first authentication window displays the first prompt information.

Optionally, the processor is specifically configured to:

determine the display location of the first authentication window based on the authentication mode and a preset correspondence, where the correspondence includes a relationship between the location of the authentication component corresponding to the authentication mode and the display location of the first authentication window.

Optionally, the processor is further configured to:

detect whether a second authentication window popped up by the third-party application is displayed on a display screen of the terminal; and if the second authentication window popped up by the third-party application is displayed on the display screen, adjust the location and/or a size of the first authentication window, so that the adjusted first authentication window blocks the second authentication window.

Optionally, the processor is further configured to:

detect whether a third authentication window popped up by the third-party application is displayed on a display screen of the terminal; and if the third authentication window popped up by the third-party application is displayed on the display screen, perform weakening processing on the third authentication window, where the weakening processing includes mask adding processing or fuzzy processing.

Optionally, the chip further includes a transmitter.

The transmitter is configured to send a notification message to the third-party application, where the notification message is used to notify the third-party application to forbid pop-up of an authentication window.

Optionally, the processor is further configured to:

dynamically adjust the size of the first authentication window based on the authentication content.

Optionally, the processor is further configured to:

determine whether the first authentication window blocks other display information on the display screen than an authentication window popped up by the third-party application; and if the first authentication window blocks the other display information, display the other blocked display information in a display area other than the first authentication window.

Optionally, the chip further includes a receiver.

The receiver is configured to receive the biological information of the user that is collected by the authentication component.

The processor is further configured to perform authentication on the biological information.

The processor is further configured to: when the authentication fails, display second prompt information in the first authentication window, where the second prompt information is used to prompt the user that the authentication fails and/or prompt the user to enter the biological information again.

Optionally, the processor is further configured to: when the authentication succeeds, jump to an operation screen of the third-party application.

A fifth aspect of this application provides a computer readable storage medium. The computer readable storage medium stores a computer program, and the computer program is used to enable a terminal to perform the method in the first aspect.

A sixth aspect of this application provides a program, and the program is executed by a processor to perform the method in the first aspect.

A seventh aspect of this application provides a computer program product. The computer program product includes computer program code, and when the computer program code is run by a terminal, the terminal is enabled to perform the method in the first aspect.

An eighth aspect of this application provides a chip system. The chip system includes a processor, configured to support an authentication window display apparatus in implementing functions in the foregoing aspect, for example, generating or processing data and/or information in the foregoing method. In a possible design, the chip system further includes a memory, and the memory is configured to store a program instruction and data that are necessary for the authentication window display apparatus. The chip system may include a chip, or may include a chip and another discrete component.

This application further provides a terminal. The terminal includes a processor, a memory, a bus, and a communications interface. The memory is configured to store a computer executable instruction. The processor and the memory are connected by using the bus. When the terminal runs, the processor executes the computer executable instruction stored in the memory, so that the terminal performs the method in the first aspect.

According to the authentication window display method and apparatus provided in this application, after the authentication request sent by the third-party application is detected, the authentication information is obtained from the third-party application, where the authentication information includes the authentication mode and the first prompt information. Then, the display location of the first authentication window is determined based on the location of the authentication component corresponding to the authentication mode and the authentication mode, where the authentication component is configured to collect the biological information of the user. In addition, the first authentication window is displayed at the display location, where the first authentication window displays the first prompt information. After the authentication request sent by the third-party application is detected, the authentication mode is obtained from the third-party application, and the display location of the first authentication window is determined based on the location of the authentication component corresponding to the authentication mode. Therefore, the user can learn of the location of the authentication component, and perform identity authentication in the first authentication window by using the authentication component, so that the authentication success rate can be increased.

DESCRIPTION OF EMBODIMENTS

Figure 1:
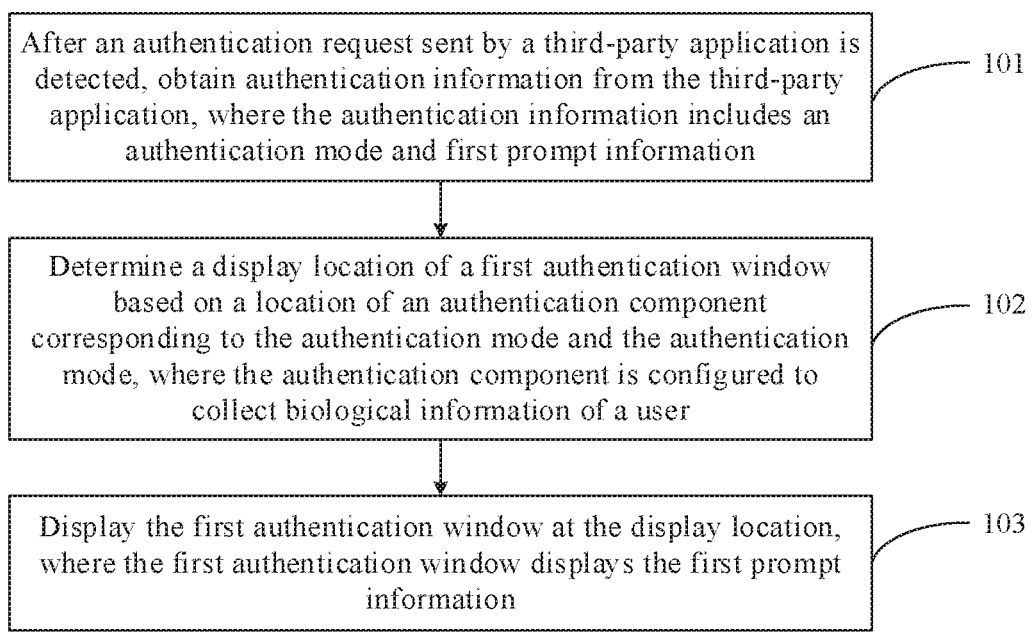
FIG. 1 is a schematic flowchart of Embodiment 1 of an authentication window display method according to this application.

In the following, some terms in this application are described, so as to help a person skilled in the art have a better understanding.

(1) A terminal is also referred to as user equipment (User Equipment, UE), a mobile station (mobile station, MS), a mobile terminal (mobile terminal, MT), or the like, and is a device that provides a user with voice and/or data connectivity, for example, a handheld device or a vehicle-mounted device having a wireless connection function. Currently, the terminal is, for example, a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote surgery (remote medical surgery), a wireless terminal in smart grid (smart grid), a wireless terminal in transportation safety (transportation safety), a wireless terminal in smart city (smart city), or a wireless terminal in smart home (smart home).

(2) A unit in this application is a function unit or a logical unit. The unit may be in a form of software, and a function of the unit is implemented by a processor executing program code. Alternatively, the unit may be in a form of hardware.

(3) "A plurality of" means two or more, and other quantifiers are similar. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects, and a range indicated by "above", "below", or the like includes boundary points.

An authentication window display method provided in the embodiments of this application may be applied to a terminal, for example, applied to a scenario of performing biological authentication by using the terminal. In the prior art, when a third-party application performs identity authentication by using a biometric recognition technology, the third-party application usually generates an authentication screen and an authentication window of the third-party application. To be specific, the third-party application determines specific content displayed on the authentication screen, a specific location at which the authentication window is displayed on the authentication screen, or the like. In addition, different third-party applications may have different authentication windows and different display locations. However, hardware of the terminal is continuously innovated currently, so that a component in the terminal is deployed in increasingly diversified forms. Therefore, the authentication screen of the third-party application may conflict with a hardware form of the terminal. For example, in a bezel-less phone, a fingerprint sensor may be disposed at a specific location on a screen. When the third-party application prompts a user to perform fingerprint authentication on the authentication screen, the user cannot accurately learn of the location of the fingerprint sensor, and consequently the authentication fails.

Therefore, the embodiments of this application provide the authentication window display method. In the method, after detecting an authentication request sent by a third-party application, a terminal obtains authentication information from the third-party application, where the authentication information includes an authentication mode and first prompt information; determines a display location of a first authentication window based on a location of an authentication component corresponding to the authentication mode and the authentication mode, where the authentication component is configured to collect biological information of a user; and displays the first authentication window at the display location, where the first authentication window displays the first prompt information. After the authentication request sent by the third-party application is detected, the authentication mode is obtained from the third-party application, and the first authentication window is displayed based on the location of the authentication component corresponding to the authentication mode. Therefore, the user can accurately learn of the location of the authentication component by using the first authentication window, and enter the biological information by using the authentication component, to perform identity authentication, so that an authentication success rate can be increased.

FIG. 1 is a schematic flowchart of Embodiment 1 of an authentication window display method according to this application. An embodiment of this application provides an authentication window display method. The method may be performed by any apparatus that performs the authentication window display method. The apparatus may be implemented by using software and/or hardware. In this embodiment, the apparatus may be integrated into a terminal. As shown in FIG. 1, the method in this embodiment may include the following steps.

Step 101: After an authentication request sent by a third-party application is detected, obtain authentication information from the third-party application, where the authentication information includes an authentication mode and first prompt information.

In this step, when the third-party application performs identity authentication by using a biometric recognition technology, the third-party application usually sends the authentication request to the terminal. In actual application, a server corresponding to the third-party application may send the authentication request to the terminal. After detecting the authentication request sent by the third-party application, the terminal obtains the authentication information from the third-party application. The authentication information includes the authentication mode and the first prompt information.

The authentication mode includes all modes that can be used by a user to perform identity authentication, for example, a fingerprint authentication mode, a facial image authentication mode, or an iris authentication mode. A specific form of the authentication mode is not limited in this embodiment of this application.

In addition, the first prompt information includes information about the authentication mode prompted by the third-party application to the user, or information used to prompt the user how to perform authentication.

Step 102: Determine a display location of a first authentication window based on a location of an authentication component corresponding to the authentication mode and the authentication mode, where the authentication component is configured to collect biological information of the user.

In this step, for each terminal, once a manner in which a component in the terminal is deployed is determined, the manner does not change. In this way, a location at which an authentication component in the terminal is deployed is fixed. Therefore, after obtaining the authentication mode, the terminal determines the display location of the first authentication window on a screen based on the location of the authentication component corresponding to the authentication mode and the authentication mode. Specifically, the first authentication window includes the authentication component. In this way, the user enters the biological information by using the authentication component in the first authentication window. In addition, the first authentication window may not include the authentication component, but the location of the authentication component needs to be indicated to the user in another manner, so that the user quickly learns of the location of the authentication component in the terminal.

The authentication component is a component configured to collect the biological information of the user. For example, if the authentication mode is the fingerprint authentication mode, the authentication component is correspondingly a fingerprint sensor; if the authentication mode is the facial image authentication mode, the authentication component is correspondingly a camera; or if the authentication mode is the iris authentication mode, the authentication component is correspondingly an iris sensor.

In addition, in a possible implementation, the display location of the first authentication window may be determined based on the authentication mode and a preset correspondence. The correspondence includes a relationship between the location of the authentication component corresponding to the authentication mode and the display location of the first authentication window.

Specifically, once a form in which each component in the terminal is deployed is determined, the form remains unchanged, and a location of each authentication component does not change after delivery. Therefore, the terminal may pre-store a correspondence between a location of an authentication component corresponding to each authentication mode and the display location of the first authentication window. After obtaining the authentication mode from the third-party application, the terminal may determine the display location of the first authentication window based on the pre-stored correspondence.

For example, when the authentication component is a camera, if the camera is disposed above the screen of the terminal, the first authentication window is correspondingly displayed above the screen; or if the camera is disposed in the middle of the screen of the terminal, the first authentication window may be correspondingly displayed in the middle of the screen. Therefore, it is ensured that a facial image of the user can be accurately captured by the camera.

For another example, when the authentication component is a fingerprint sensor, and the fingerprint sensor is disposed in the middle of the screen of the terminal, the first authentication window may be correspondingly displayed in the middle of the screen, so that the user can accurately learn of a location of the fingerprint sensor, thereby ensuring that the user can accurately place a finger on the fingerprint sensor to collect fingerprint data of the user.

Further, it can be understood that, in another possible implementation, after obtaining the authentication anode and learning of the authentication component corresponding to the authentication mode, the terminal may obtain the location of the authentication component in the terminal by reading internal data, to determine the display location of the first authentication window based on the location of the authentication component. In this way, the location of the authentication component may be prompted to the user by using the first authentication window, so that it can be ensured that biometric information for authentication can be accurately collected by, the authentication component. The terminal may obtain the location of the authentication component in the terminal in any manner in the prior art. For a method for obtaining the location of the authentication component, details are not described in this application.

In addition, as a quantity of authentication modes and a quantity of authentication components of the terminal increase, an operating system in the terminal provides a unified biometric authentication interface. Therefore, the third-party application can query validity of the interface and select an appropriate authentication mode.

Step 103: Display the first authentication window at the display location, where the first authentication window displays the first prompt information.

In this step, after determining the display location, the terminal displays the first authentication window at the display location. The first authentication window displays the first prompt information, to prompt the user to perform identity authentication.

Further, the operating system in the terminal opens authentication of an application programming interface (application programming interface, API) to the third-party application. The third-party application may invoke an authentication function of the operating system, and obtain an authentication result.

An example in which identity authentication needs to be performed when a user performs payment by using a terminal is used below for description.

Figure 2A:
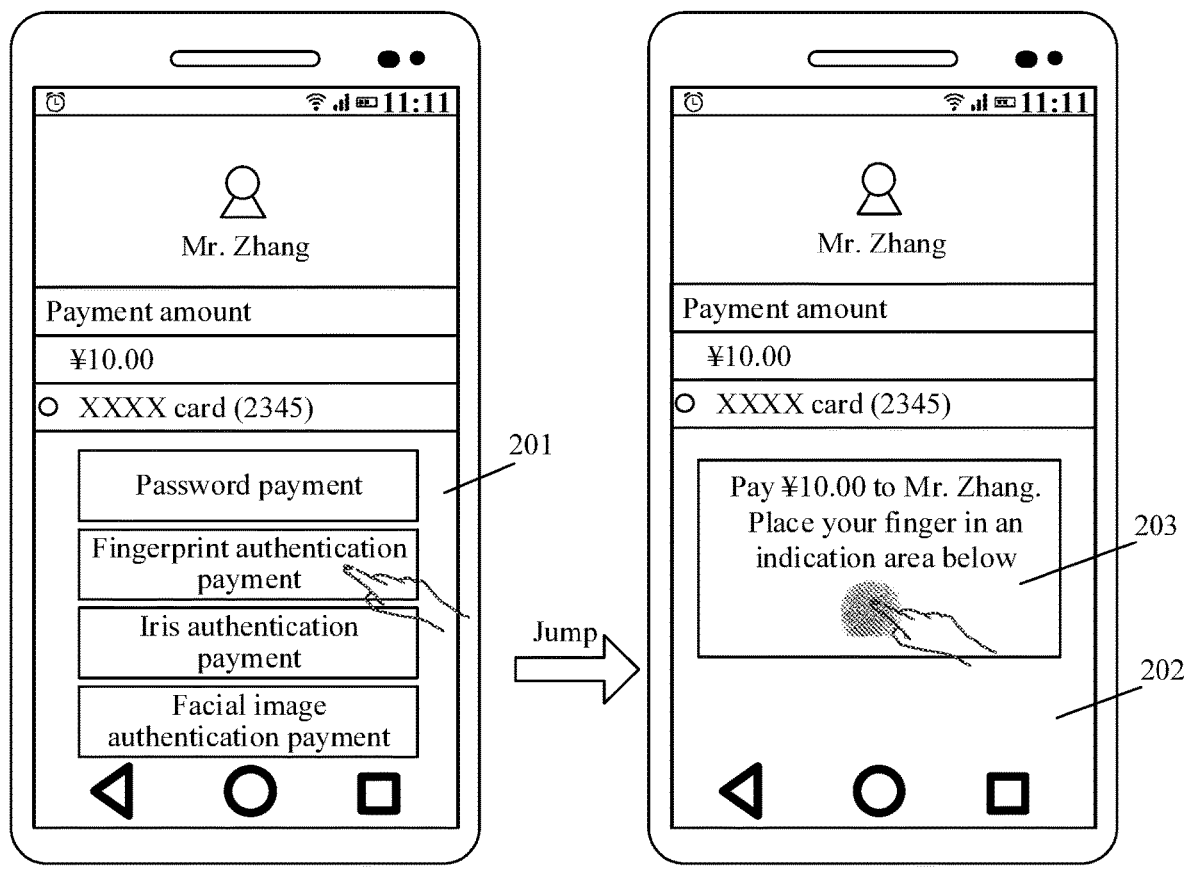
FIG. 2A is a schematic diagram of displaying a first authentication window during fingerprint authentication.

FIG. 2A is a schematic diagram of displaying a first authentication window during fingerprint authentication. As shown in FIG. 2A, when the user performs payment, a plurality of authentication modes are displayed on a payment screen 201, for example, password payment, fingerprint authentication payment, iris authentication payment, and facial image authentication payment. If the user taps "fingerprint authentication payment", a screen displayed in the terminal jumps from the payment screen 201 to an authentication screen 202.

Because the terminal can learn of a location of each sensor, when the terminal learns that a fingerprint sensor is at a specific location on the screen, the terminal determines a display location of a first authentication window 203 based on the location of the fingerprint sensor, and displays the first authentication window 203 at the display location. In a possible implementation, the fingerprint sensor may be included in the first authentication window 203, and pattern information is displayed at the location of the fingerprint sensor, to prompt the user to enter fingerprint data at the location. The first authentication window 203 displays first prompt information, for example, "Pay ¥10.00 to Mr. Zhang. Place your finger in an indication area below". Therefore, the user may enter the fingerprint data based on the first prompt information, so that user experience can be improved.

Figure 2B:
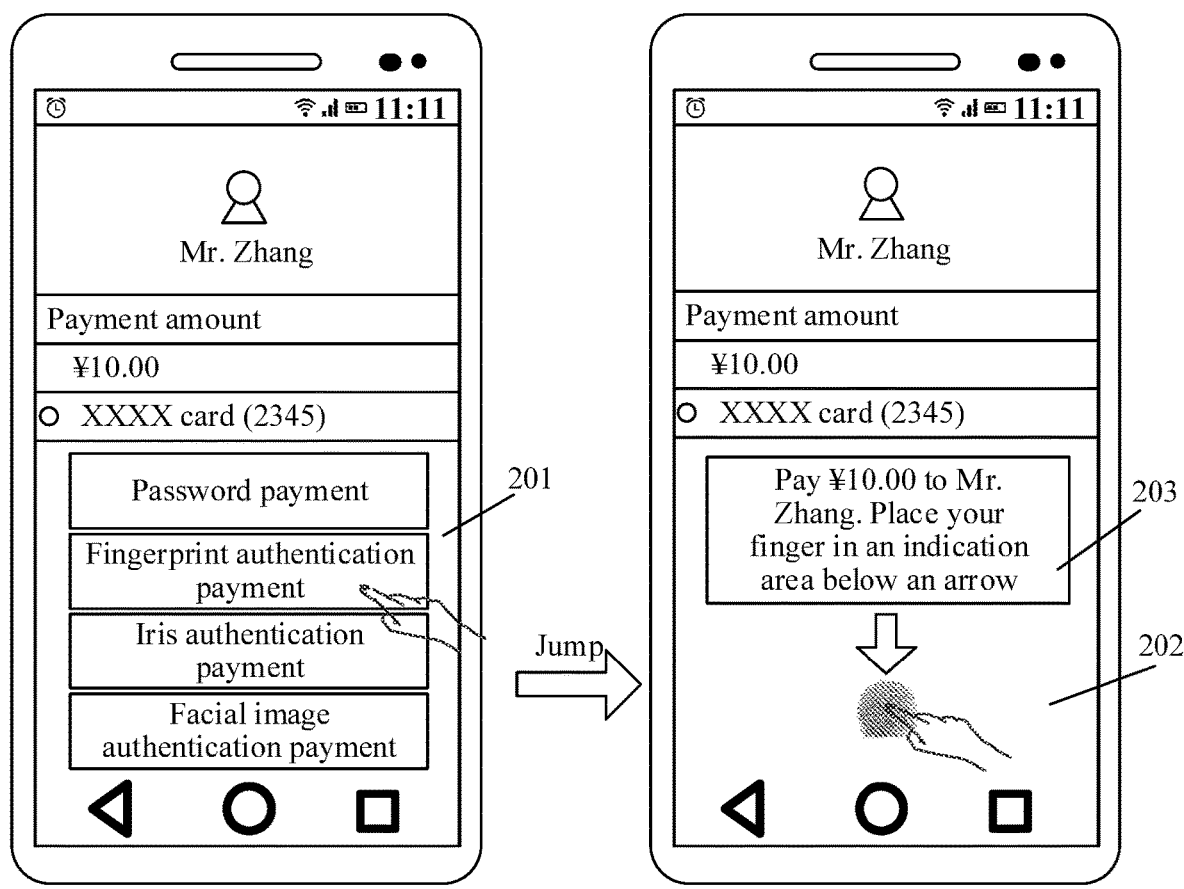
FIG. 2B is another schematic diagram of displaying a first authentication window during fingerprint authentication.

In addition, in another possible implementation, FIG. 2B is another schematic diagram of displaying a first authentication window during fingerprint authentication. As shown in FIG. 2B, when the terminal learns of a location of a fingerprint sensor and determines a location of a first authentication window 203 based on the location of the fingerprint sensor, the fingerprint sensor may not be included in the first authentication window 203. For example, the first authentication window 203 may be displayed above the fingerprint sensor, and the location of the fingerprint sensor is indicated to the user by using another indication identifier, for example, by using an arrow. The first authentication window 203 displays first prompt information, for example, "Pay ¥10.00 to Mr. Zhang. Place your finger in an indication area below an arrow". Therefore, the user may enter fingerprint data based on the first prompt information, so that user experience can be improved.

Moreover, a person skilled in the art can understand that the first authentication window 203 may alternatively be displayed at another location around the fingerprint sensor. For example, the first authentication window 203 is displayed on the left or on the right of the fingerprint sensor, or below the fingerprint sensor, provided that the location of the fingerprint sensor can be indicated to the user by using other indication information, so that the user can correctly enter the fingerprint data. A specific display location of the first authentication window is not limited in this embodiment of this application.

Figure 3:
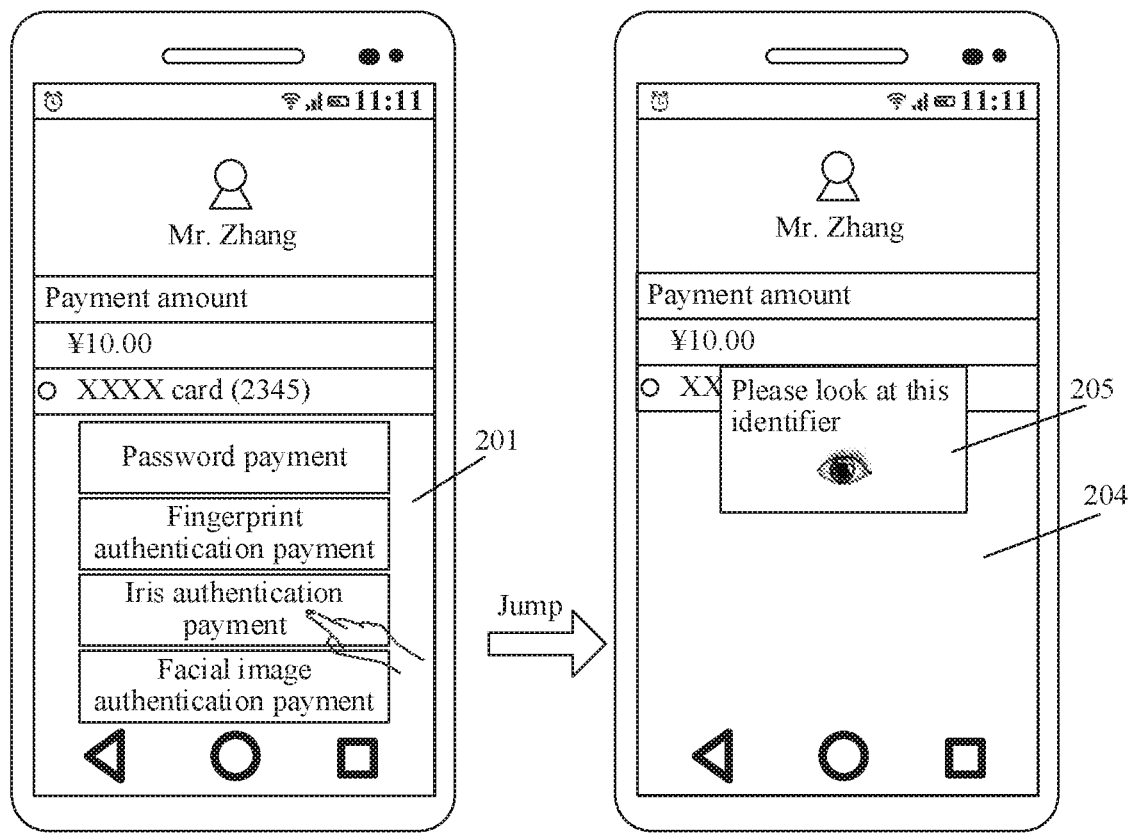

FIG. 3 is a schematic diagram of displaying a first authentication window during iris authentication. As shown in FIG. 3, when the user performs payment, a plurality of authentication modes are displayed on a payment screen 201, for example, password payment, fingerprint authentication payment, iris authentication payment, and facial image authentication payment. If the user taps "iris authentication payment", a screen displayed in the terminal jumps from the payment screen 201 to an authentication screen 204.

After learning of a location of an iris sensor on the screen, the terminal determines a display location of a first authentication window 205 based on the location of the iris sensor, and displays the first authentication window 205 at the display location. In a possible implementation, the iris sensor may be included in the first authentication window 205, and pattern information is displayed at the location of the iris sensor, to prompt the user to enter iris data at the location. The first authentication window 205 displays first prompt information, for example, "Please look at this identifier". Therefore, the user may enter the iris data based on the first prompt information, so that user experience can be improved.

In addition, when the terminal determines the display location of the first authentication window based on the location of the iris sensor, the iris sensor may not be included in the first authentication window. For example, the first authentication window may be displayed in an area around the iris sensor, and the location of the iris sensor is indicated to the user by using another indication identifier, for example, by using an arrow. A manner of displaying the first authentication window that is not included in the iris sensor is similar to a manner of displaying the first authentication window that is not included in the fingerprint sensor, and details are not described herein again.

Figure 4:
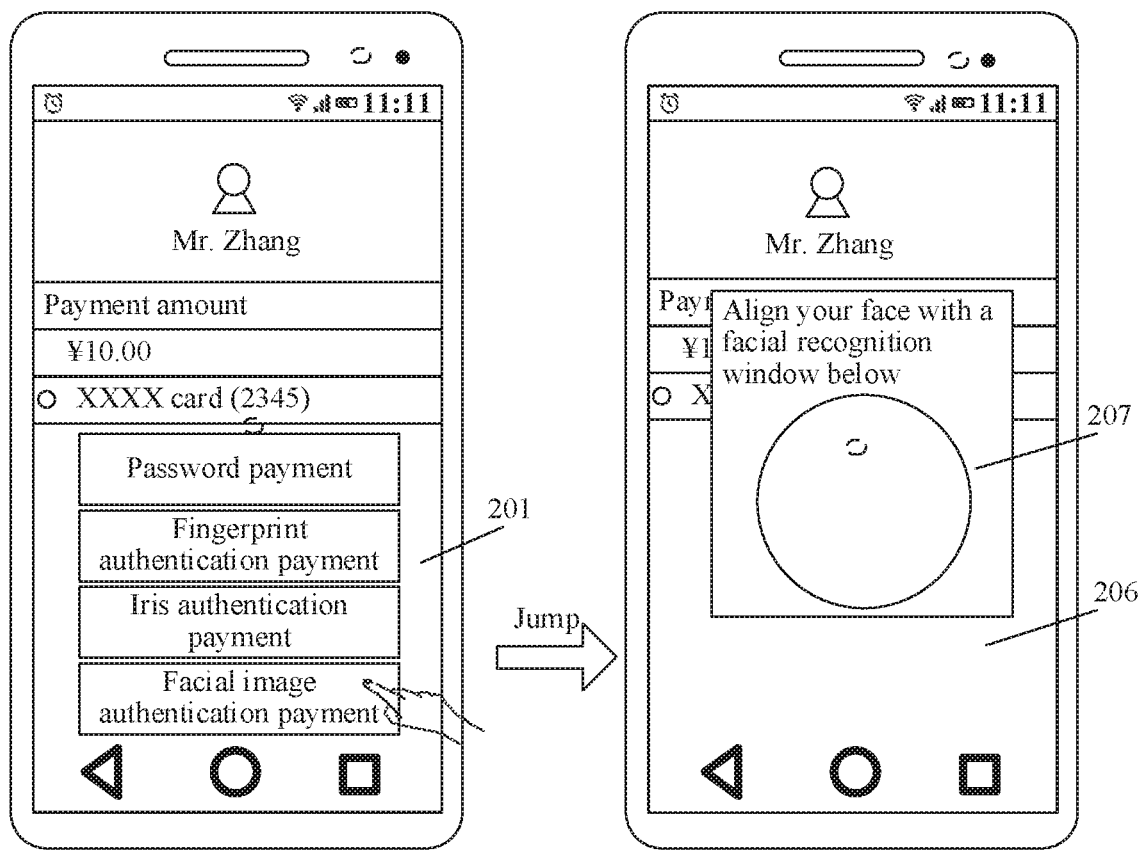

FIG. 4 is a schematic diagram of displaying a first authentication window during facial image authentication. As shown in FIG. 4, when the user performs payment, a plurality of authentication modes are displayed on a payment screen 201, for example, password payment, fingerprint authentication payment, iris authentication payment, and facial image authentication payment. If the user taps "facial image authentication payment", a screen displayed in the terminal jumps from the payment screen 201 to an authentication screen 206.

After learning of a location at which a camera is deployed in the terminal, the terminal determines a display location of a first authentication window 207 based on the location of the camera, and displays the first authentication window 207 at the display location. In a possible implementation, the camera may be included in the first authentication window 207, and pattern information is displayed at the location of the camera, to prompt the user to enter facial image data at the location. The first authentication window 207 displays first prompt information, for example, "Align your face with a facial recognition window below". Therefore, the user may enter the facial image data based on the first prompt information, so that user experience can be improved.

In addition, when the terminal determines the display location of the first authentication window based on the location of the camera, the camera may not be included in the first authentication window. For example, the first authentication window may be displayed in an area around the camera, and the location of the camera is indicated to the user by using another indication identifier, for example, by using an arrow. A manner of displaying the first authentication window that is not included in the camera is similar to a manner of displaying the first authentication window that is not included in the fingerprint sensor, and details are not described herein again.

Further, if the camera is disposed above the screen of the terminal, the first authentication window may be correspondingly displayed above the screen based on the location at which the camera is deployed. Therefore, it can be ensured that a facial image of the user is correctly collected, so that identity authentication accuracy can be improved.

An example in which a third-party application is a payment application and the payment application invokes a biometric recognition and authentication function is used below for description. This is similar to a process in which another third-party application performs biometric recognition and authentication, and details are not described herein again.

The terminal implements a biometrics manager to encapsulate various biometric recognition interfaces for scheduling such as fingerprint scheduling, and exposes only a biometrics manager interface at an application layer. When the payment application performs biometric recognition and authentication, the payment application may set a template of a biometric authentication window and required data by using an authentication data set. An ADSL communication is established between SystemUI of a system authentication screen and a biometrics manager service (biometrics manager service) through registration with authentication view callback (authentication view callback). Finally, registration with the biometrics manager (biometrics manager) is performed in a biometric authentication mode provided by the terminal, to complete an authentication process.

Therefore, to avoid a prior-art problem in which an authentication screen conflicts with an authentication component, in this embodiment of this application, display locations of the authentication screen and the first authentication window are both determined by the terminal, the terminal provides template information of the authentication screen, and the operating system in the terminal provides the template information for the third-party application for use.

In addition, to ensure that information generated when the third-party application performs identity authentication can be presented to the user, the third-party application may also display related information in the first authentication window on the authentication screen that is determined by the terminal.

Optionally, after the terminal displays the first authentication window on a display screen, the third-party application may also pop up an authentication window on the display screen. To prevent the user from being confused, the terminal further needs to perform related processing on the authentication window popped up by the third-party application. Specific processing manners are described as follows:

Manner 1: It is detected Whether a second authentication window popped up by the third-party application is displayed on the display screen of the terminal. If the second authentication window popped up by the third-party application is displayed on the display screen, the location and/or a size of the first authentication window are/is adjusted, so that the adjusted first authentication window blocks the second authentication window.

Figure 5A:
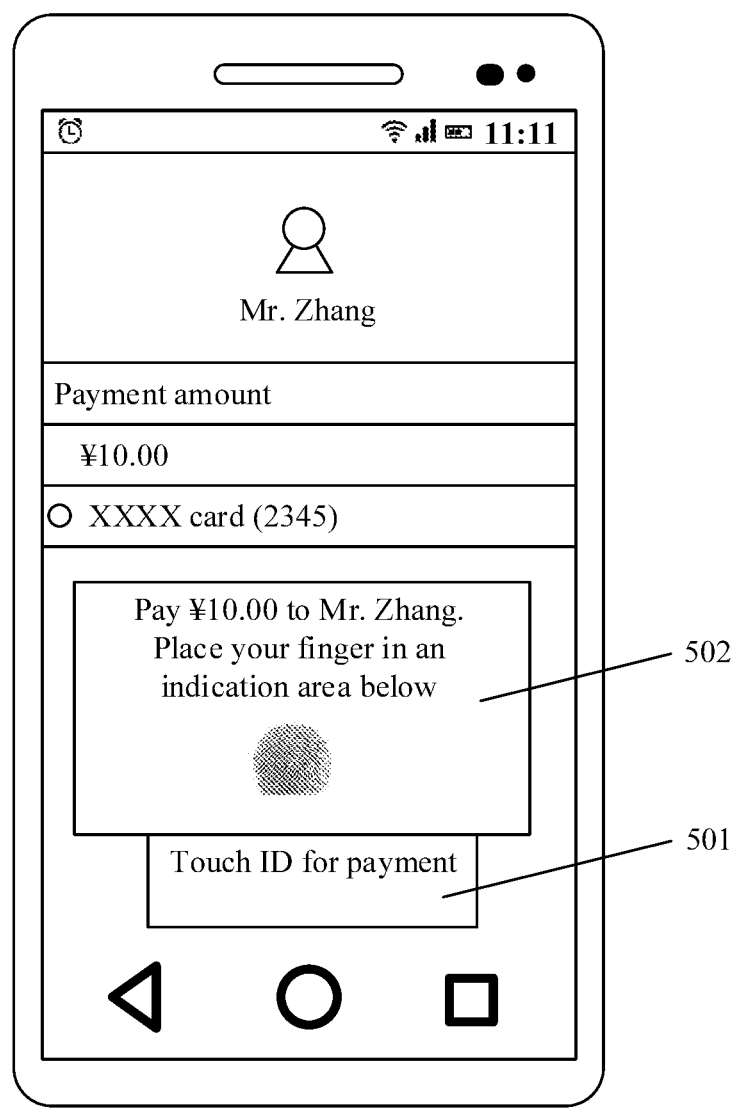
FIG. 5A is a schematic diagram before a first authentication window is adjusted.
Figure 5B:
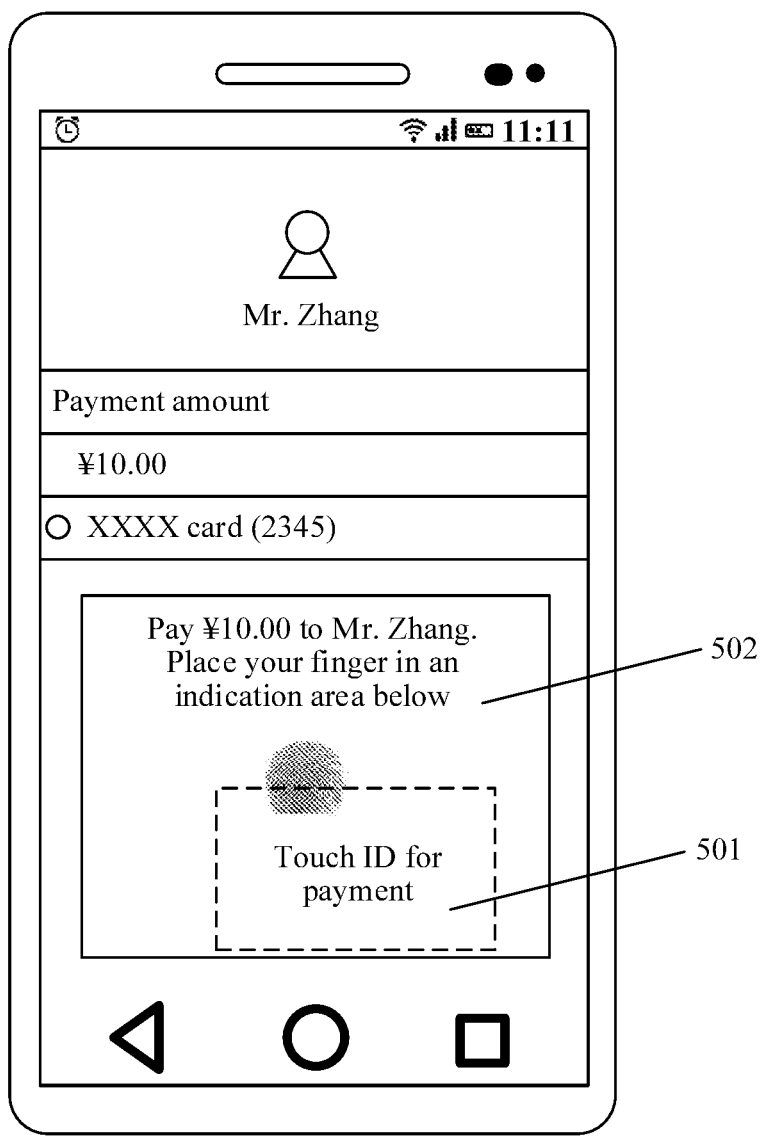
FIG. 5B is a schematic diagram after a first authentication window is adjusted.

Specifically, FIG. 5A is a schematic diagram before a first authentication window is adjusted, and FIG. 5B is a schematic diagram after a first authentication window is adjusted. As shown in FIG. 5A and FIG. 5B, when the terminal detects that a second authentication window 501 popped up by the third-party application is further displayed on the display screen, the terminal may adjust a location of the first authentication window 502, or adjust a size of the first authentication window 502, or adjust both a location and a size of the first authentication window 502, so that the adjusted first authentication window 502 can block the second authentication window 501 (as shown in FIG. 5B). It should be noted that, after the location and/or the size of the first authentication window are/is adjusted, the location of the authentication component further needs to be prompted to the user while the first authentication window can block the second authentication window. To be specific, it needs to be ensured that the user can accurately enter the biometric authentication information by using the adjusted first authentication window.

In this manner, after detecting that the second authentication window popped up by the third-party application is displayed on the display screen, the terminal adjusts the location and/or the size of the first authentication window, so that the adjusted first authentication window can block the second authentication window. Therefore, the second authentication window popped up by the third-party application does not confuse the user, so that user experience can be improved.

Manner 2: It is detected whether a third authentication window popped up by the third-party application is displayed on the display screen of the terminal. If the third authentication window popped up by the third-party application is displayed on the display screen, weakening processing is performed on the third authentication window, where the weakening processing includes mask adding processing and/or fuzzy processing.

Figure 6A:
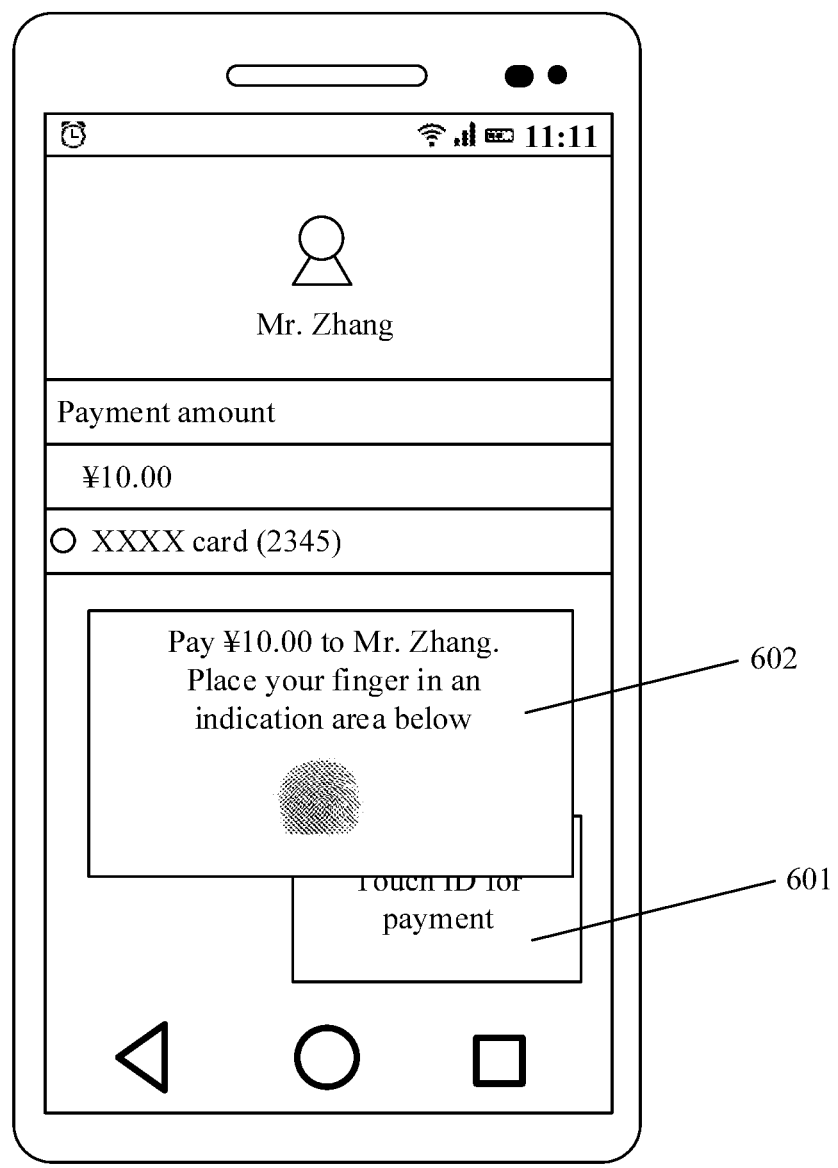
FIG. 6A is a schematic diagram of a first authentication window before weakening processing.
Figure 6B:
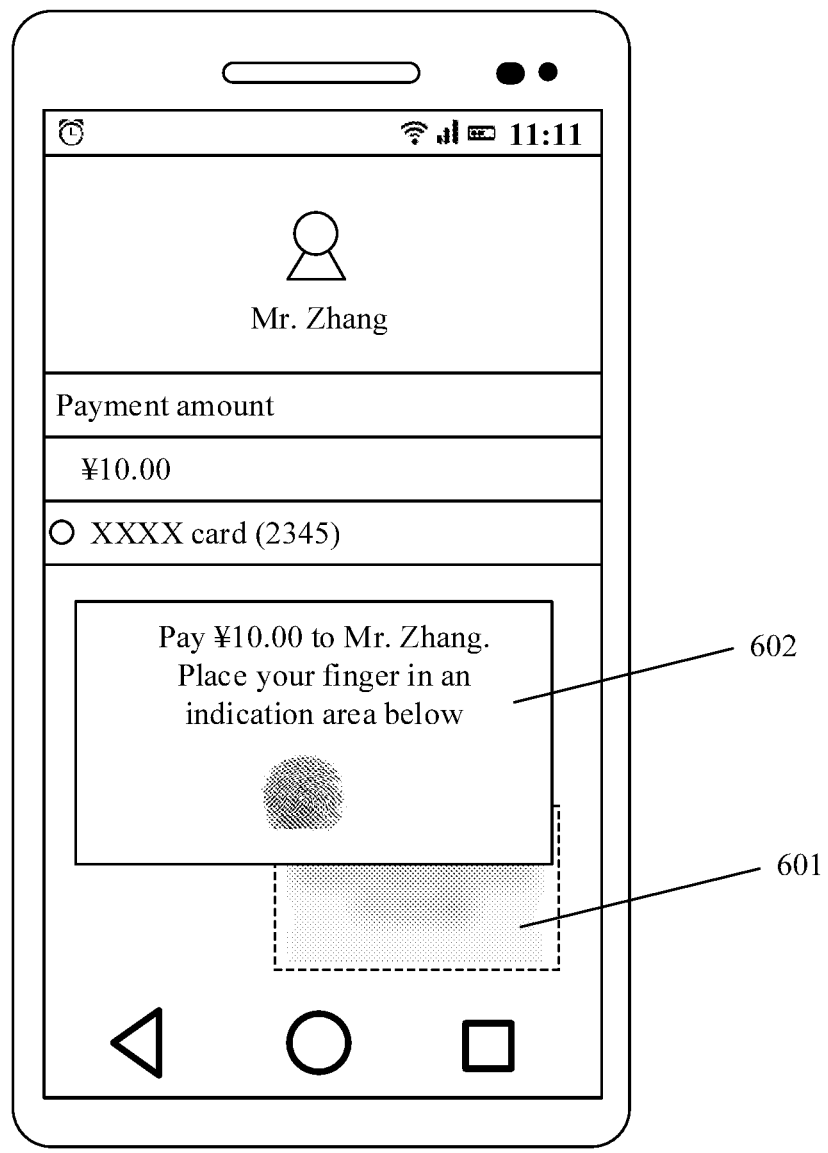
FIG. 6B is a schematic diagram of a first authentication window after weakening processing.

Specifically, FIG. 6A is a schematic diagram of a first authentication window before weakening processing, and FIG. 6B is a schematic diagram of a first authentication window after weakening processing. As shown in FIG. 6A and FIG. 6B, when the terminal detects that a third authentication window 601 popped up by the third-party application is further displayed on the display screen, the terminal may perform weakening processing on the third authentication window 601. In a specific implementation process, mask adding processing may be performed on the third authentication window 601, or fuzzy processing may be performed on the third authentication window 601, or both mask adding processing and fuzzy processing may be performed on the third authentication window 601. Therefore, the third authentication window that is popped up by the third-party application and on which weakening processing is performed does not confuse the user, so that user experience can be improved.

It should be noted that, in the foregoing manners, how to adjust or weaken the first authentication window when the authentication mode is fingerprint authentication is used as an example for description. A manner of adjusting or weakening the first authentication window in another authentication mode is similar to a manner of adjusting or weakening the first authentication window through fingerprint authentication, and details are not described herein again.

Manner 3: A notification message is sent to the third-party application, where the notification message is used to notify the third-party application to forbid pop-up of a fourth authentication window.

Specifically, when displaying the first authentication window on the display screen, the terminal may send the notification message to the third-party application, to notify the third-party application to forbid pop-up of the fourth authentication window. In other words, the third-party application pops up no authentication window on the display screen. In this case, only the first authentication window is displayed on the display screen of the terminal, and therefore the user is not confused, so that user experience can be improved.

In this embodiment of this application, to ensure consistency of user experience and prevent the user from being interfering with during determining, the authentication screen, the first authentication window, and an operable option of the user are all determined by the terminal.

Further, because the first authentication window displays the first prompt information, the terminal may further dynamically adjust the size of the first authentication window based on the first prompt information.

Figure 7A:
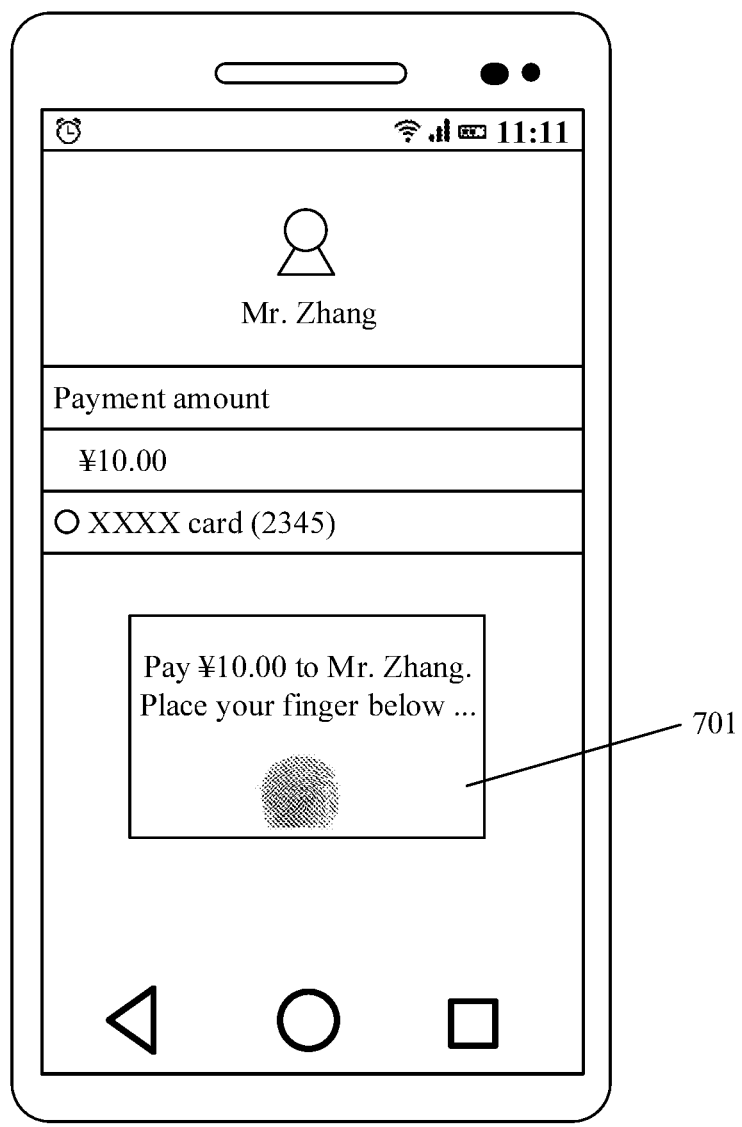
FIG. 7A is a schematic diagram before a size of a first authentication window is adjusted.
Figure 7B:
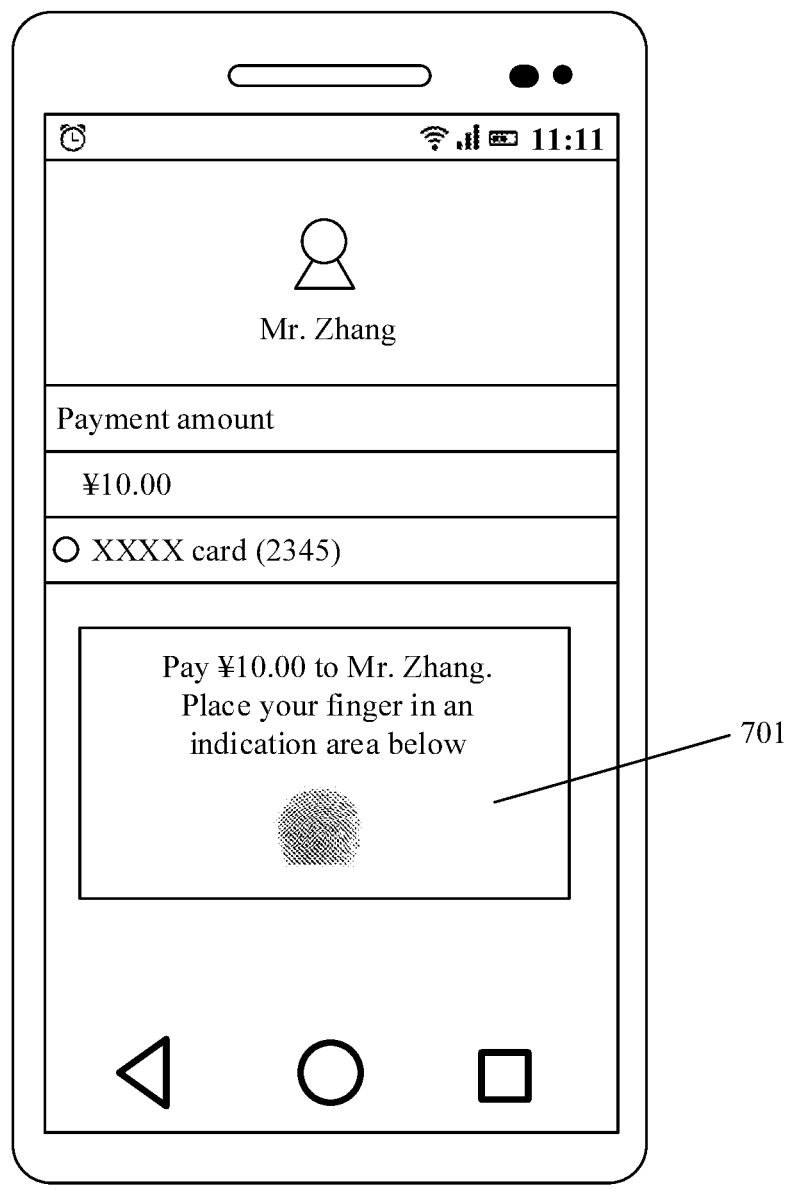
FIG. 7B is a schematic diagram after a size of a first authentication window is adjusted.

Specifically, FIG. 7A is a schematic diagram before a size of a first authentication window is adjusted, and FIG. 7B is a schematic diagram after a size of a first authentication window is adjusted. As shown in FIG. 7A and FIG. 7B, after the terminal determines a display location of a first authentication window 701, the terminal displays the first authentication window 701 at the display location, and the first authentication window 701 displays first prompt information. The first prompt information includes information about the authentication mode prompted by the third-party application to the user, and information used to prompt the user how to perform authentication. When the first prompt information includes a relatively large amount of content, a size of the first authentication window 701 may be increased, so that all the content of the first prompt information is displayed in the first authentication window 701 through plaintext.

In addition, when the first prompt information includes a relatively small amount of content, the size of the first authentication window 701 may be reduced. Therefore, when all the content of the first prompt information is displayed in the first authentication window 701 through plaintext, an area occupied by the first authentication window 701 on the display screen may be further reduced.

It should be noted that, after the size of the first authentication window is adjusted, the location of the authentication component further needs to be prompted to the user while the first authentication window can display the first prompt information. To be specific, it needs to be ensured that the user can accurately enter the biometric authentication information by using the adjusted first authentication window.

In the foregoing embodiment, the terminal may dynamically adjust the size of the first authentication window based on the first prompt information, to display all content of the first prompt information in the first authentication window through plaintext. Therefore, the user can clearly view all the content of the first prompt information without a need of performing another operation, so that user experience can be improved.

In addition, optionally, after displaying the first authentication window at the display location, the terminal further determines whether the first authentication window blocks other display information on the display screen than an authentication window popped up by the third-party application. If the first authentication window blocks the other display information, the terminal displays the other blocked display information in a display area other than the first authentication window.

Figure 8A:
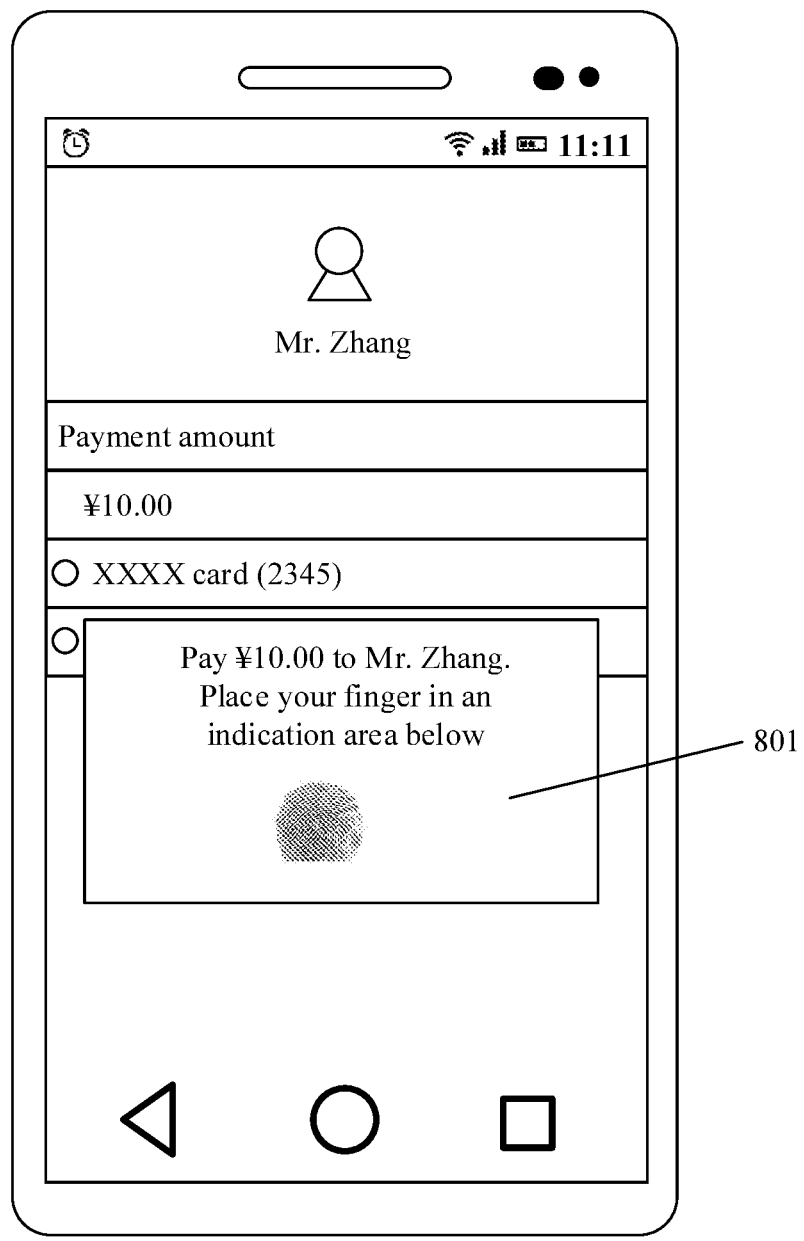
FIG. 8A is a schematic diagram before other blocked display information is processed.
Figure 8B:
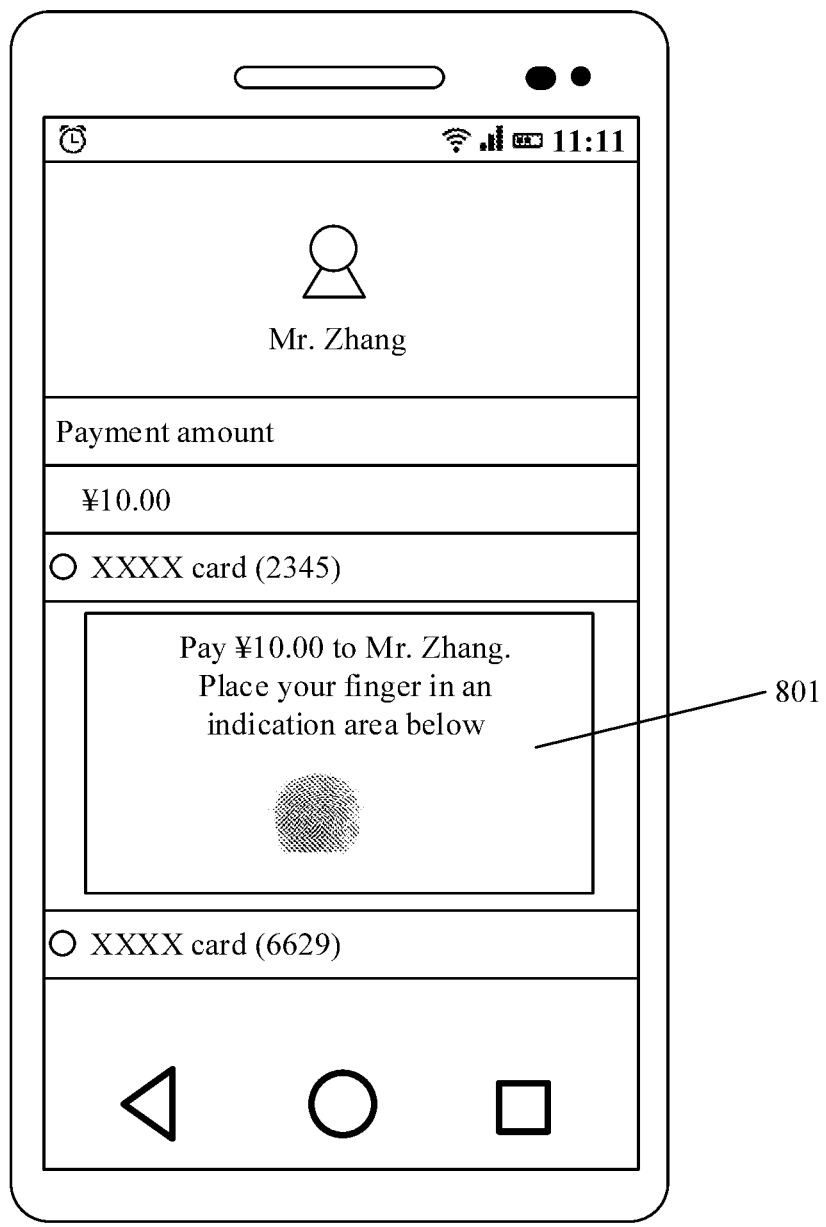
FIG. 8B is a schematic diagram after other blocked display information is processed.

Specifically, FIG. 8A is a schematic diagram before other blocked display information is processed, and FIG. 8B is a schematic diagram after other blocked display information is processed. As shown in FIG. 8A and FIG. 8B, after the terminal displays a first authentication window at a determined display location, the terminal further needs to determine whether the first authentication window 801 blocks other display information on the display screen than the authentication window popped up by the third-party application. If the first authentication window 801 blocks the other display information, for example, information "XXXX card (6629)", to enable the user to clearly view all display information, the terminal displays the other blocked display information in a display area other than the first authentication window, for example, displays "XXXX card (6629)" below the first authentication window.

In this embodiment, when determining that the first authentication window blocks the other display information on the display screen than the authentication window popped up by the third-party application, the terminal displays the other blocked display information in the display area other than the first authentication window. Therefore, the user can clearly view all the display information, so that user experience can be improved.

According to the authentication window display method provided in this embodiment of this application, after detecting the authentication request sent by the third-party application, the terminal obtains the authentication information from the third-party application, where the authentication information includes the authentication mode and the first prompt information; determines the display location of the first authentication window based on the location of the authentication component corresponding to the authentication mode and the authentication mode, where the authentication component is configured to collect the biological information of the user; and displays the first authentication window at the display location, where the first authentication window displays the first prompt information. After the authentication request sent by the third-party application is detected, the authentication mode is obtained from the third-party application, and the display location of the first authentication window is determined based on the location of the authentication component corresponding to the authentication mode. Therefore, the user can learn of the location of the authentication component, and perform identity authentication in the first authentication window by using the authentication component, so that an authentication success rate can be increased.

Figure 9:
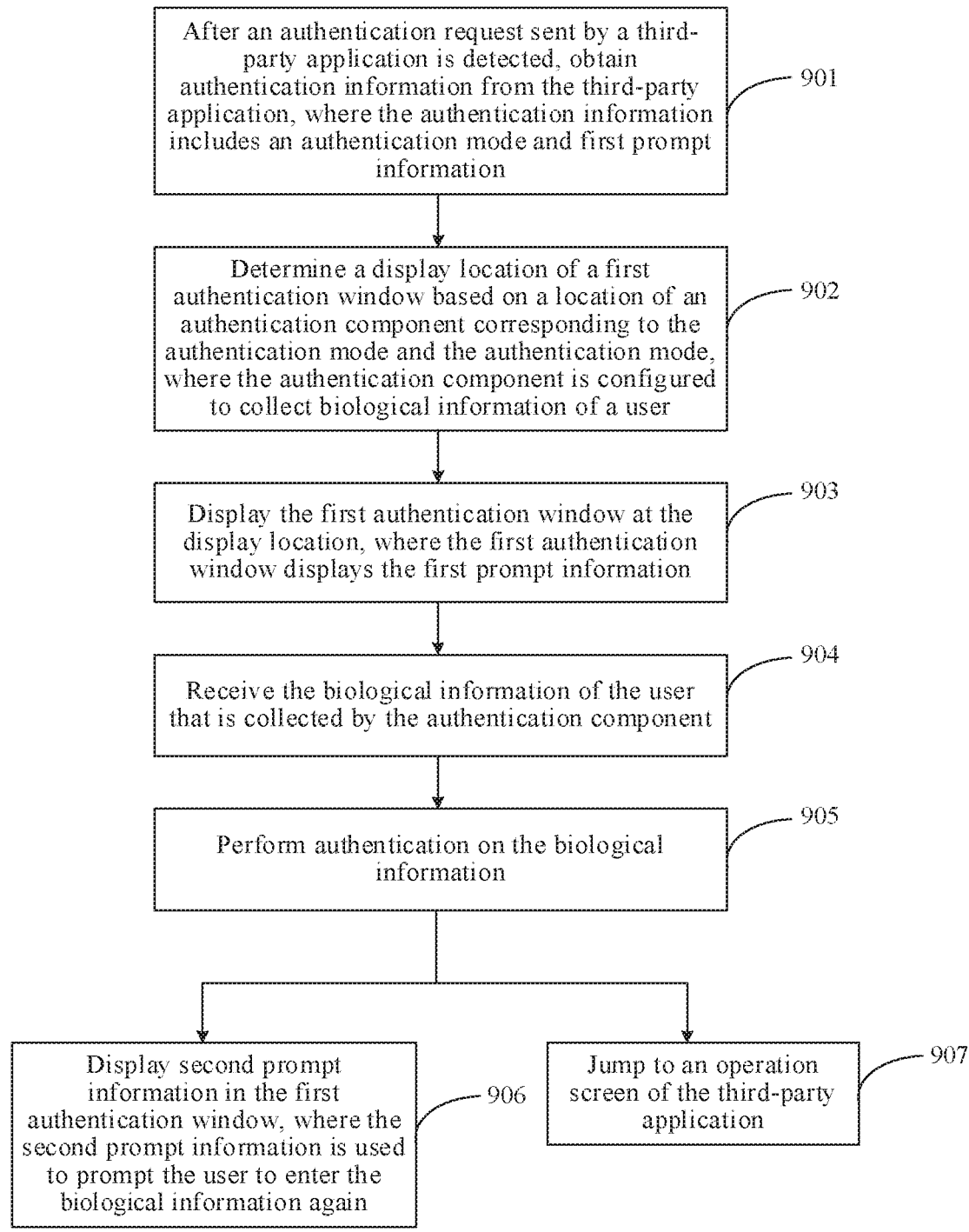

FIG. 9 is a schematic flowchart of Embodiment 2 of an authentication window display method according to this application. Based on the embodiment shown in FIG. 1, this embodiment is described in detail by using an embodiment of performing, after a first authentication window is displayed at a display location, authentication on biological information of a user that is collected by an authentication component. As shown in FIG. 9, the method in this embodiment may include the following steps.

Step 901: After an authentication request sent by a third-party application is detected, obtain authentication information from the third-party application, where the authentication information includes an authentication mode and first prompt information.

Step 902: Determine a display location of a first authentication window based on a location of an authentication component corresponding to the authentication mode and the authentication mode, where the authentication component is configured to collect biological information of a user.

Step 903: Display the first authentication window at the display location, where the first authentication window displays the first prompt information.

Step 901 to step 903 are similar to step 101 to step 103, and are not described herein again.

Step 904: Receive the biological information of the user that is collected by the authentication component.

In this embodiment, after a terminal displays the first authentication window at the display location, the user enters the biological information based on the first prompt information in the first authentication window by using the authentication component.

Step 905: Perform authentication on the biological information.

In this embodiment, after receiving the biological information of the user that is collected by the authentication component, the terminal performs authentication on the collected biological information. In actual application, the terminal pre-stores biological information. When performing authentication, the terminal matches the collected biological information against the pre-stored biological information. If the matching succeeds, it indicates that the authentication succeeds; or if the matching fails, it indicates that the authentication fails.

If the authentication fails, step 906 is performed; or if the authentication succeeds, step 907 is performed.

Step 906: Display second prompt information in the first authentication window, where the second prompt information is used to prompt the user to enter the biological information again.

Figure 10A:
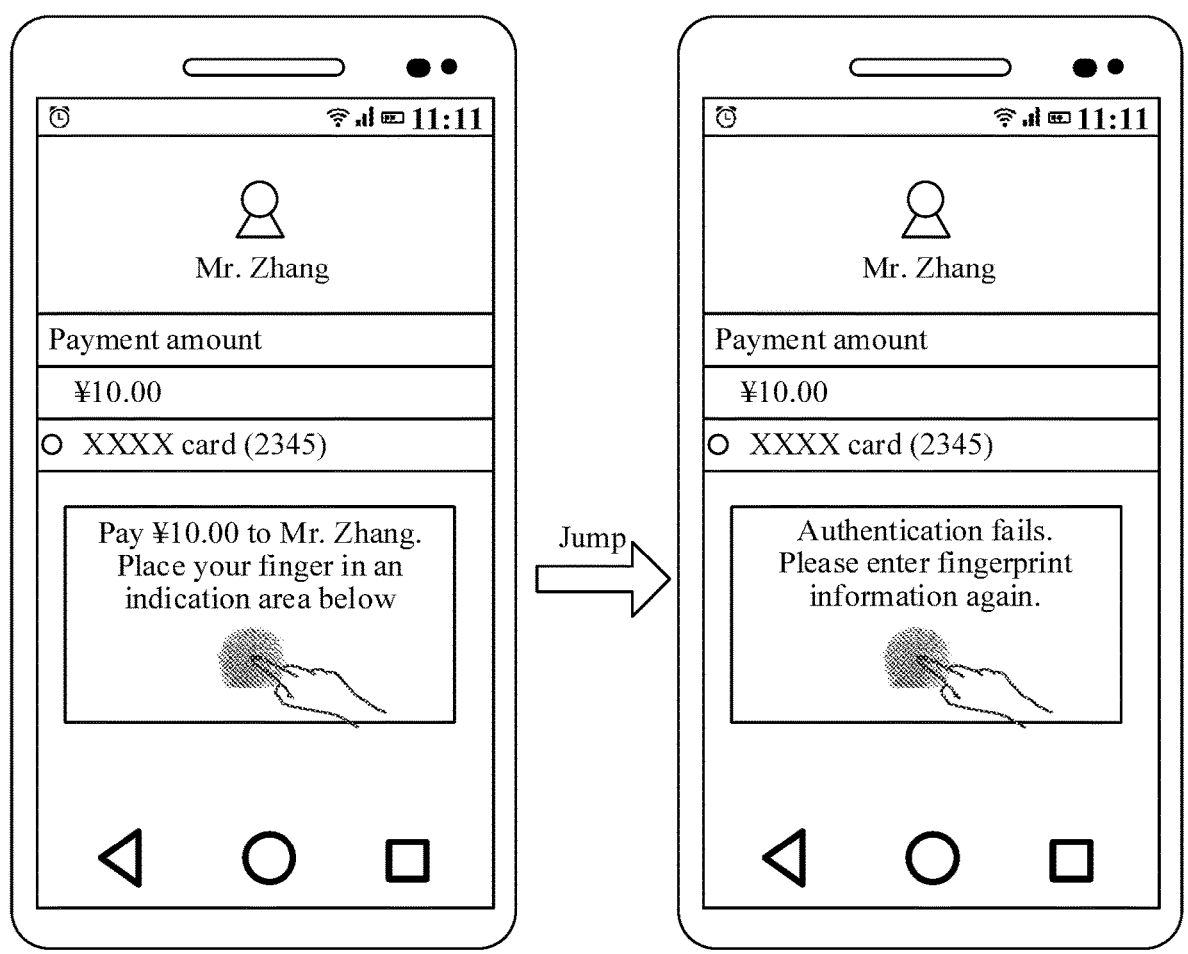
FIG. 10A is a schematic diagram of displaying a first authentication window.

Specifically, FIG. 10A is a schematic diagram of displaying a first authentication window. As shown in FIG. 10A, after the user enters fingerprint data based on the first prompt information in the first authentication window, if the fingerprint data entered by the user does not match fingerprint data pre-stored in the terminal, the terminal displays the second prompt information in the first authentication window, to prompt the user to enter the biological information again. For example, the terminal displays "Authentication fails. Please enter fingerprint information again" in the first authentication window.

Step 907: Jump to an operation screen of the third-party application.

Figure 10B:
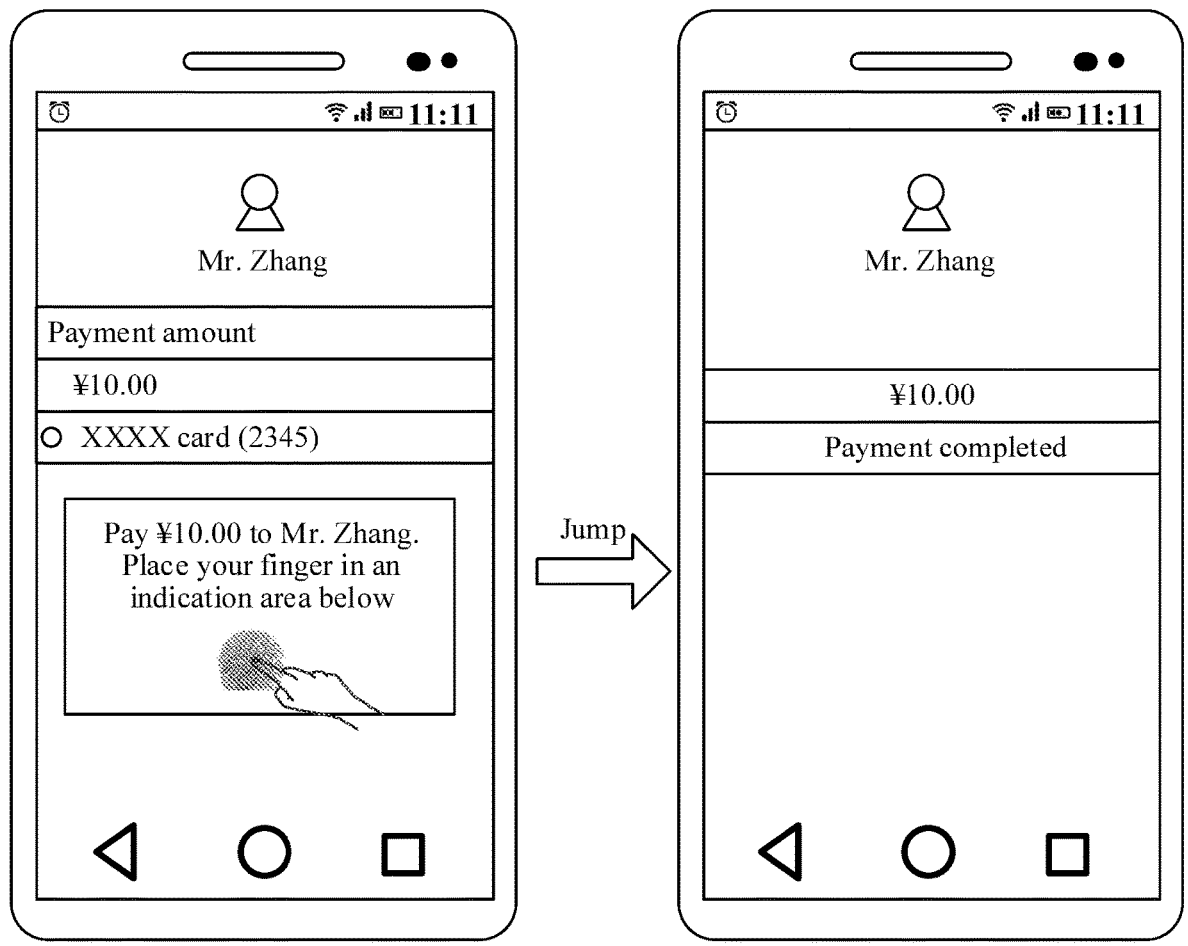
FIG. 10B is a schematic diagram of an operation screen of a third-party application.

Specifically, FIG. 10B is a schematic diagram of an operation screen of a third-party application. As shown in FIG. 10B, after the user enters fingerprint data based on the first prompt information in the first authentication window, if the fingerprint data entered by the user successfully matches fingerprint data pre-stored in the terminal, the operation screen of the third-party application is jumped to. For example, "Payment complete" is displayed on the operation screen.

According to the authentication window display method provided in this embodiment of this application, after displaying the first authentication window at the display location, the terminal receives the biological information of the user that is collected by the authentication component, and performs authentication on the biological information. If the authentication fails, the first authentication window displays the second prompt information. The second prompt information is used to prompt the user that the authentication fails, or prompt the user to enter the biological information again when or after the user is prompted that the authentication fails, or prompt the user to enter the biological information again. If the authentication succeeds, the operation screen of the third-party application is jumped to. After the authentication fails, the second prompt information is displayed in the first authentication window to prompt the user. Therefore, when the user enters the biological information again, the user can still learn of the location of the authentication component, and perform identity authentication in the first authentication window by using the authentication component, so that an authentication success rate can be increased.

Figure 11:
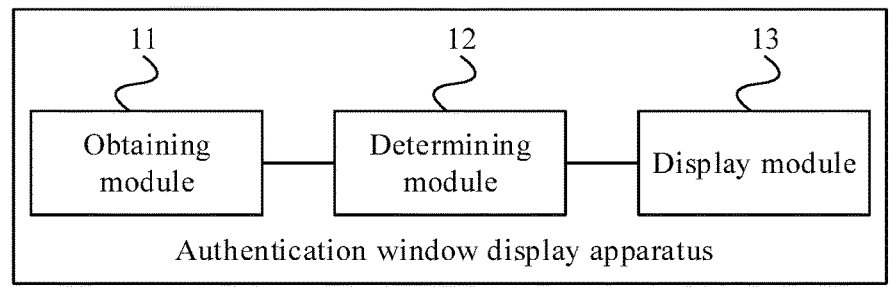
FIG. 11 is a schematic structural diagram of an authentication window display apparatus according to an embodiment of this application.

This application further provides the following apparatus embodiments. All the apparatus embodiments are used to implement the methods in the foregoing method embodiments. Specifically, FIG. 11 is a schematic structural diagram of an authentication window display apparatus according to an embodiment of this application. Referring to FIG. 11, the apparatus includes an obtaining module 11, a determining module 12, and a display module 13.

The obtaining module 11 is configured to: after an authentication request sent by a third-party application is detected, obtain authentication information from the third-party application, where the authentication information includes an authentication mode and first prompt information.

The determining module 12 is configured to determine a display location of a first authentication window based on a location of an authentication component corresponding to the authentication mode and the authentication mode, where the authentication component is configured to collect biological information of a user.

The display module 13 is configured to display the first authentication window at the display location, where the first authentication window displays the first prompt information.

The authentication window display apparatus provided in this embodiment of this application may perform the foregoing corresponding method embodiment. Implementation principles and technical effects are similar, and are not described herein again.

Optionally, the determining module 12 is specifically configured to:

determine the display location of the first authentication window based on the authentication mode and a preset correspondence, where the correspondence includes a relationship between the location of the authentication component corresponding to the authentication mode and the display location of the first authentication window.

Figure 12:
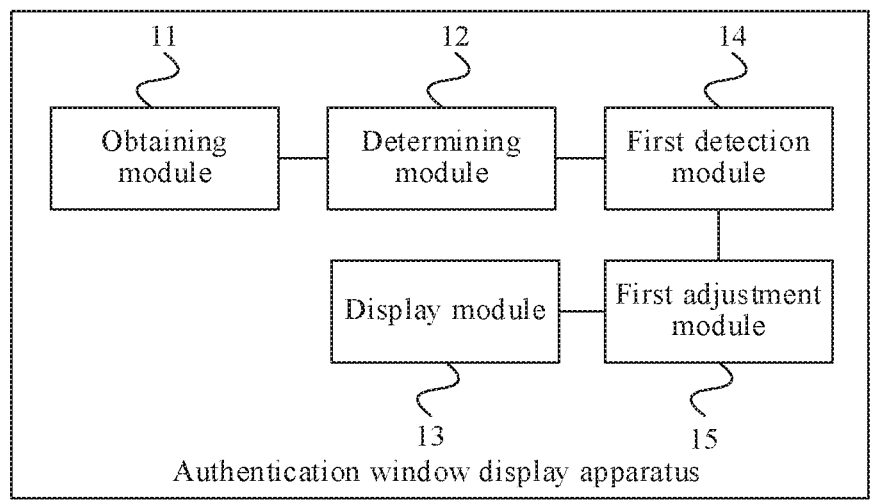
FIG. 12 is another schematic structural diagram of an authentication window display apparatus according to an embodiment of this application.

FIG. 12 is another schematic structural diagram of an authentication window display apparatus according to an embodiment of this application. Referring to FIG. 12, on a basis of the apparatus shown in FIG. 11, the apparatus further includes a first detection module 14 and a first adjustment module 15.

The first detection module 14 is configured to detect whether a second authentication window popped up by the third-party application is displayed on a display screen of the terminal.

The first adjustment module 15 is configured to: when the first detection module 14 detects that the second authentication window popped up by the third-party application is displayed on the display screen, adjust the location and/or a size of the first authentication window, so that the adjusted first authentication window blocks the second authentication window.

The authentication window display apparatus provided in this embodiment of this application may perform the foregoing corresponding method embodiment, Implementation principles and technical effects are similar, and are not described herein again.

Figure 13:
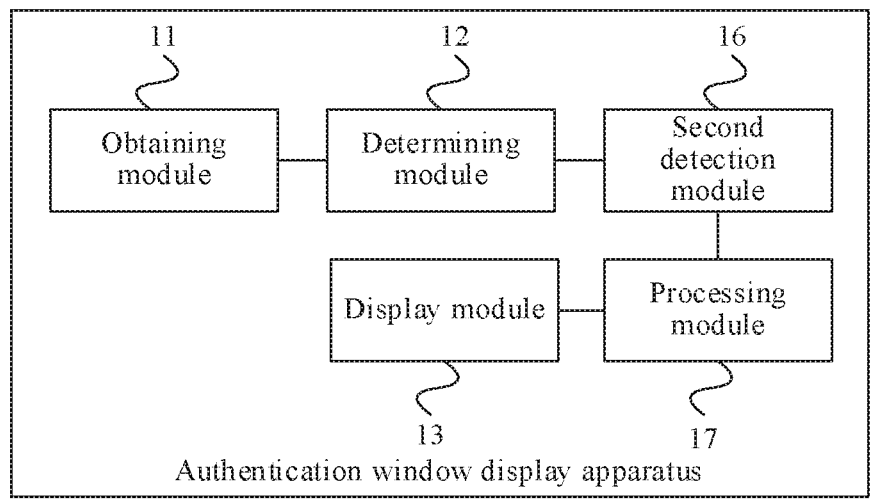
FIG. 13 is still another schematic structural diagram of an authentication window display apparatus according to an embodiment of this application.

FIG. 13 is still another schematic structural diagram of an authentication window display apparatus according to an embodiment of this application. Referring to FIG. 13, on a basis of the apparatus shown in FIG. 11, the apparatus further includes a second detection module 16 and a processing module 17.

The second detection module 16 is configured to detect whether a third authentication window popped up by the third-party application is displayed on a display screen of the terminal.

The processing module 17 is configured to: when the second detection module 16 detects that the third authentication window popped up by the third-party application is displayed on the display screen, perform weakening processing on the third authentication window, where the weakening processing includes mask adding processing or fuzzy processing.

The authentication window display apparatus provided in this embodiment of this application may perform the foregoing corresponding method embodiment. Implementation principles and technical effects are similar, and are not described herein again.

Figure 14:
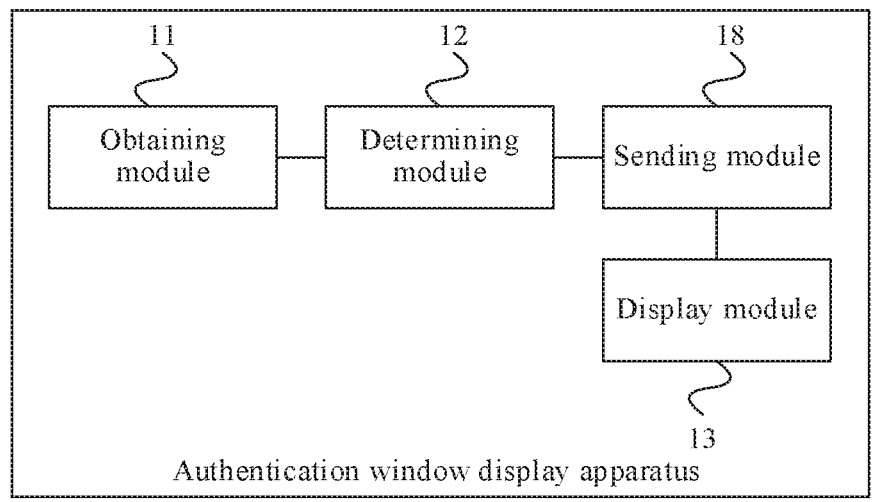
FIG. 14 is yet another schematic structural diagram of an authentication window display apparatus according to an embodiment of this application.

FIG. 14 is yet another schematic structural diagram of an authentication window display apparatus according to an embodiment of this application. Referring to FIG. 14, on a basis of the apparatus shown in FIG. 11, the apparatus further includes a sending module 18.

The sending module 18 is configured to send a notification message to the third-party application, where the notification message is used to notify the third-party application to forbid pop-up of a fourth authentication window.

The authentication window display apparatus provided in this embodiment of this application may perform the foregoing corresponding method embodiment. Implementation principles and technical effects are similar, and are not described herein again.

Figure 15:
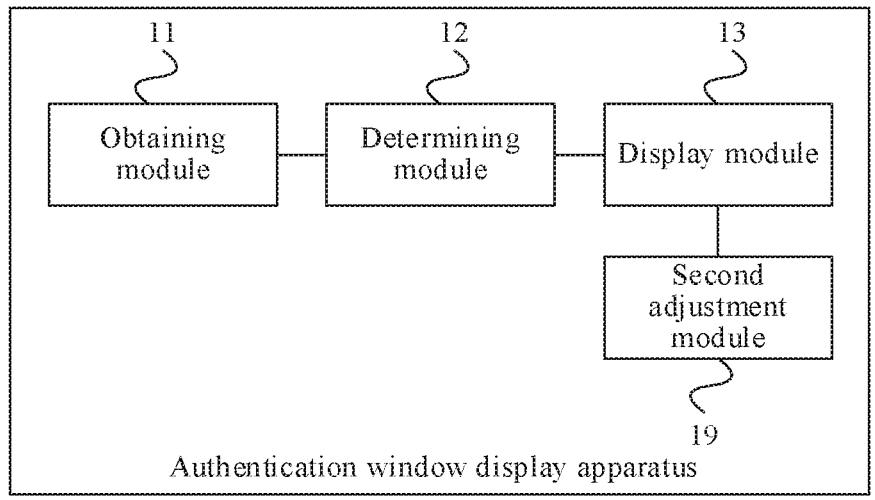
FIG. 15 is still yet another schematic structural diagram of an authentication window display apparatus according to an embodiment of this application.

FIG. 15 is still yet another schematic structural diagram of an authentication window display apparatus according to an embodiment of this application Referring to FIG. 15, on a basis of the apparatus shown in FIG. 11, the apparatus further includes a second adjustment module 19.

The second adjustment module 19 is configured to dynamically adjust the size of the first authentication window based on the authentication content.

Figure 16:
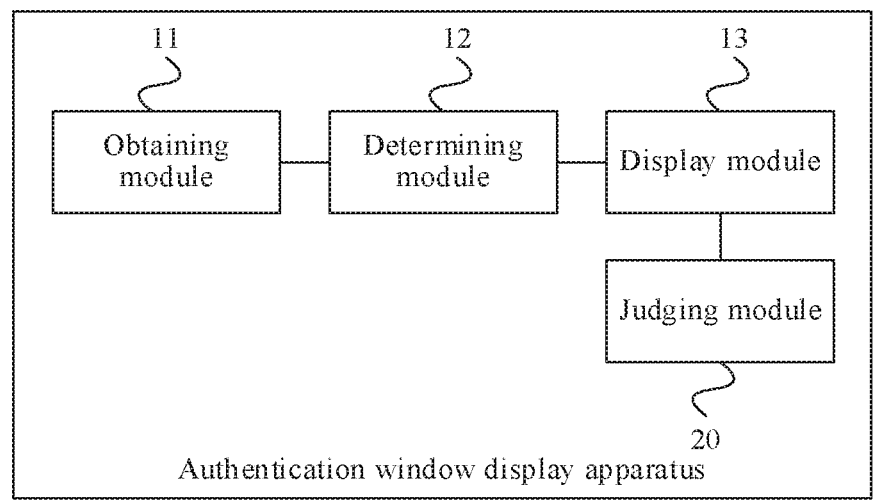
FIG. 16 is a further schematic structural diagram of an authentication window display apparatus according to an embodiment of this application.

FIG. 16 is a further schematic structural diagram of an authentication window display apparatus according to an embodiment of this application. Referring to FIG. 16, on a basis of the apparatus shown in FIG. 11, the apparatus further includes a judging module 20.

The judging module 20 is configured to determine Whether the first authentication window blocks other display information on the display screen than an authentication window popped up by the third-party application.

The display module 13 is further configured to: when the judging module 20 determines that the first authentication window blocks the other display information, display the other blocked display information in a display area other than the first authentication window.

Figure 17:
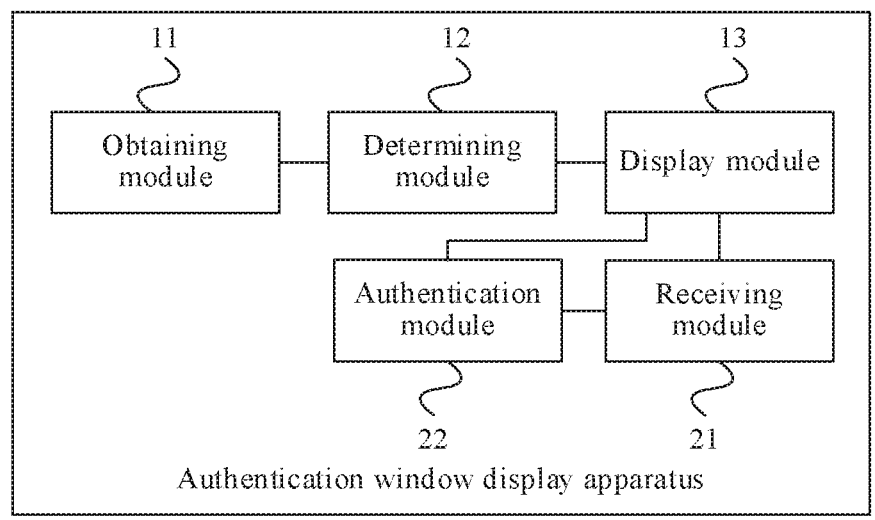
FIG. 17 is a still further schematic structural diagram of an authentication window display apparatus according to an embodiment of this application.

FIG. 17 is a still further schematic structural diagram of an authentication window display apparatus according to an embodiment of this application, Referring to FIG. 17, on a basis of the apparatus shown in FIG. 11, the apparatus further includes a receiving module 21 and an authentication module 22.

The receiving module 21 is configured to receive the biological information of the user that is collected by the authentication component.

The authentication module 22 is configured to perform authentication on the biological information.

The display module 13 is further configured to: when the authentication performed by the authentication module 22 fails, display second prompt information in the first authentication window, where the second prompt information is used to prompt the user to enter the biological information again.

Optionally, a jump module 23 is configured to: when the authentication performed by the authentication module succeeds, jump to an operation screen of the third-party application.

The authentication window display apparatus provided in this embodiment of this application may perform the foregoing corresponding method embodiment. Implementation principles and technical effects are similar, and are not described herein again.

It should be noted and understood that the module division of the foregoing apparatus is merely logical function division. During actual implementation, some or all modules may be integrated into one physical entity, or may be physically separated. In addition, these modules may all be implemented in a form of software invoked by using a processing element, or may all be implemented in a form of hardware, or some of the modules may be implemented in a form of software invoked by using a processing element and some of the modules may be implemented in a form of hardware. For example, the sending module may be a separately disposed processing element, or may be integrated into a specific chip of the apparatus for implementation. In addition, the sending module may be stored in a memory of the apparatus in a form of a program and invoked by a specific processing element of the apparatus to perform a function of the sending module. Implementations of other modules are similar to the implementation of the sending module. In addition, the units may be integrated together or may be individually implemented. The processing element herein may be an integrated circuit and has a signal processing capability. In an implementation process, steps in the foregoing methods or the foregoing units can be implemented by using a hardware integrated logical circuit in the processing element, or h using an instruction in a form of software. In addition, the foregoing sending module is a sending control module, and may send information by using a sending apparatus of the apparatus, for example, an antenna and a radio frequency apparatus.

The foregoing modules may be configured as one or more integrated circuits for performing the foregoing method, for example, one or more application-specific integrated circuits, ASIC, one or more microprocessors (digital signal processor, DSP), or one or more field programmable gate arrays, FPGA. For another example, when one of the foregoing units is implemented in a form of a processing element scheduling a program, the processing element may be a general purpose processor, for example, a central processing unit, CPU or another processor that can invoke a program. For another example, the units may be integrated together and implemented in a form of a system-on-a-chip, SOC.

Figure 18:
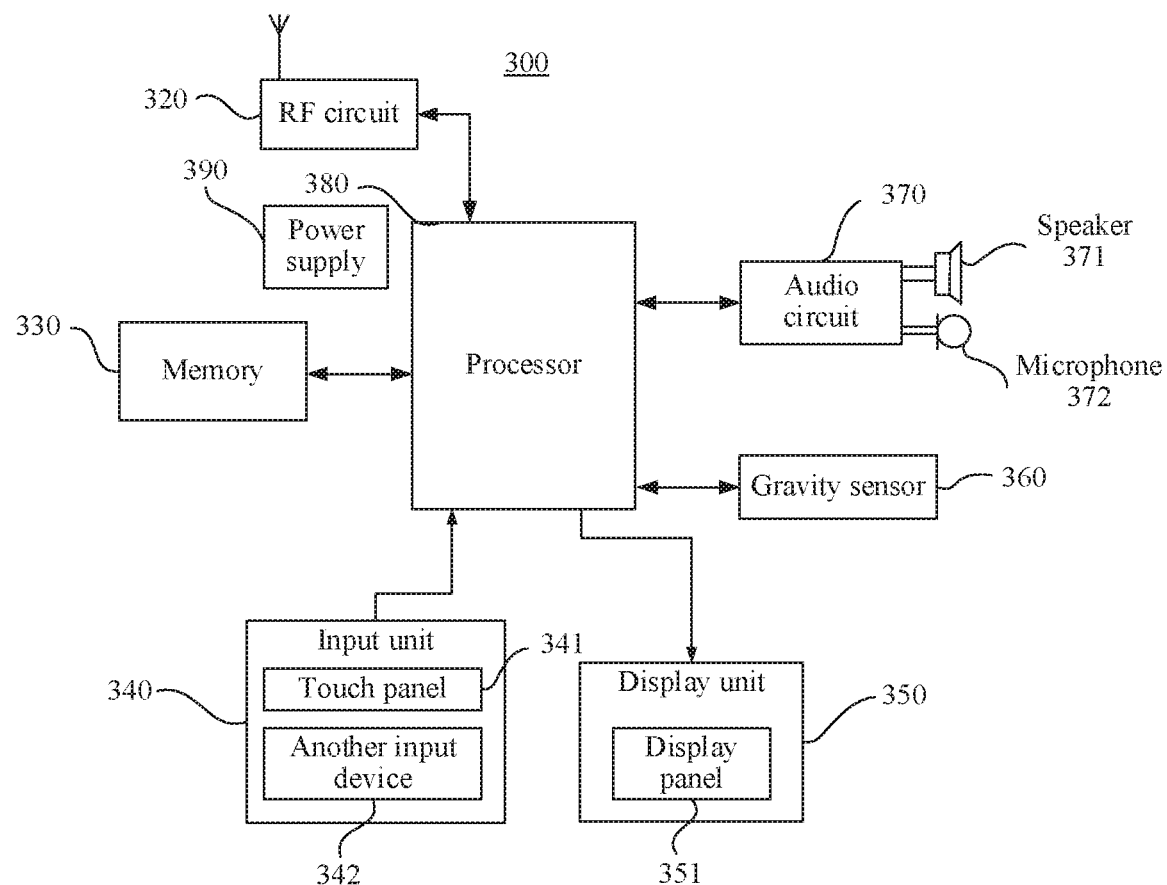
FIG. 18 is a schematic structural diagram of a terminal according to an embodiment of this application.

FIG. 18 is a schematic structural diagram of a terminal according to an embodiment of this application. The terminal provided in this embodiment of this application may be configured to perform the methods implemented in the embodiments of this application in FIG. 1 and FIG. 9. For ease of description, only a part related to this embodiment of this application is shown. For specific technical details that are not disclosed, refer to the embodiments of this application shown in FIG. 1 and FIG. 9.

The terminal may be a terminal device such as a mobile phone, a tablet computer, a notebook computer, an ultra-mobile personal computer (ultra-mobile personal computer, UMPC), a netbook, or a personal digital assistant (personal digital assistant, PDA). An example in which the terminal is a mobile phone is used to describe this embodiment of this application. FIG. 18 is a block diagram of a part of a structure of a mobile phone 300 related to the embodiments of this application.

As shown in FIG. 18, the mobile phone 300 includes components such as a radio frequency (radio frequency, RF) circuit 320, a memory 330, an input unit 340, a display unit 350, a gravity sensor 360, an audio circuit 370, a processor 380, and a power supply 390. A person skilled in the art may understand that the structure of the mobile phone shown in FIG. 18 does not constitute a limitation on the mobile phone, and the mobile phone may include more or fewer components than those shown in the figure, or combine some components, or have different component arrangements.

The following describes all the components of the mobile phone 300 in detail with reference to FIG. 18.

The RF circuit 320 may be configured to receive and send a signal in an information receiving and sending process or in a call process. Particularly, after receiving downlink information from a base station, the RF circuit 320 sends the downlink information to the processor 380 for processing, and sends uplink data to the base station. Generally, the RF circuit includes but is not limited to an antenna, at least one amplifier, a transceiver, a coupler, an LNA (low noise amplifier), a duplexer, and the like. In addition, the RF circuit 320 may further communicate with a network and another device through wireless communication. The wireless communication may use any communication standard or protocol, including but not limited to a global system for mobile communications, GSM, a general packet radio service (general packet radio service, GPRS), code division multiple access (code division multiple access, CDMA), wideband code division multiple access (wideband code division multiple access, WCDMA), long term evolution (long term evolution, LTE), an email, a short message service, SMS, and the like.

The memory 330 may be configured to store a software program and a module. The processor 380 runs the software program and the module stored in the memory 330, to perform various function applications of the mobile phone 300 and data processing. The memory 330 may mainly include a program storage area and a data storage area. The program storage area may store an operating system, an application required by at least one function (for example, a sound playback function or an image play function), or the like. The data storage area may store data (for example, audio data, image data, or a phone book) created when the mobile phone 300 is used, or the like. In addition, the memory 330 may include a high-speed random access memory, or may include a nonvolatile memory, such as at least one magnetic disk storage device, a flash memory, or another nonvolatile solid-state storage device.

The input unit 340 may be configured to: receive input digital or character information; and generate a key signal input related to a user setting and function control of the mobile phone 300. Specifically, the input unit 340 may include a touchscreen 341 and another input device 342. The touchscreen 341 is also referred to as a touch panel, and may collect a touch operation performed by a user on or near the touchscreen 341 (for example, an operation performed by the user on the touchscreen 341 or near the touchscreen 341 by using any proper object or accessory such as a finger or a stylus), and drive a corresponding connection apparatus based on a preset program. Optionally, the touchscreen 341 may include two parts: a touch detection apparatus and a touch controller. The touch detection apparatus detects a touch orientation of the user, detects a signal generated by the touch operation, and transmits the signal to the touch controller. The touch controller receives touch information from the touch detection apparatus, converts the touch information into touch point coordinates, and then sends the touch point coordinates to the processor 380. In addition, the touch controller may receive a command sent by the processor 380, and execute the command. Moreover, the touchscreen 341 may be implemented in a plurality of types, such as a resistive type, a capacitive type, an infrared ray type, and a surface acoustic wave type. In addition to the touchscreen 341, the input unit 340 may further include the another input device 342. Specifically, the another input device 342 may include but is not limited to one or more of a physical keyboard, a function key (such as a volume control key or a switch key), a trackball, a mouse, a joystick, and the like.

The display unit 350 may be configured to display information entered by the user or information provided for the user, and various menus of the mobile phone 300. The display unit 350 may include a display panel 351. Optionally, the display panel 341 may be configured in a form of a liquid crystal display (liquid crystal display, LCD), an organic light-emitting diode (organic light-emitting diode, OLED), or the like. Further, the touchscreen 341 may cover the display panel 351. After detecting the touch operation performed on or near the touchscreen 341, the touchscreen 341 sends the touch operation to the processor 380 to determine a type of a touch event and then the processor 380 provides a corresponding visual output on the display panel 351 based on the type of the touch event. In FIG. 18, the touchscreen 341 and the display panel 351 are used as two independent components to implement input and output functions of the mobile phone 300. However, in some embodiments, the touchscreen 341 and the display panel 351 may be integrated to implement the input and output functions of the mobile phone 300.

The gravity sensor (gravity sensor) 360 may detect a magnitude of acceleration in each direction (usually, in three axes) of the mobile phone, may detect a magnitude and a direction of gravity when the gravity sensor 360 is stationary, and may be used in an application for identifying a posture of the mobile phone (for example, screen switching between a landscape mode and a portrait mode, a related game, and magnetometer posture calibration), a vibration identification-related function (for example, a pedometer or a knock), and the like.

The mobile phone 300 may further include another sensor, such as a light sensor. Specifically, the light sensor may include an ambient light sensor and a proximity sensor. The ambient light sensor may adjust luminance of the display panel 341 based on ambient light luminance. The proximity sensor may detect whether an object is approaching or touches the mobile phone, and may power off the display panel 341 and/or backlight when the mobile phone 300 approaches an ear. The mobile phone 300 may be further provided with another sensor such as a gyroscope, a barometer, a hygrometer, a thermometer, or an infrared sensor. Details are not described herein.

The audio circuit 370, a speaker 371, and a microphone 372 may provide an audio interface between the user and the mobile phone 300. The audio circuit 370 may convert received audio data into an electrical signal and transmit the electrical signal to the speaker 371, and the speaker 371 converts the electrical signal into a sound signal for output.

In addition, the microphone 372 converts a collected sound signal into an electrical signal, and the audio circuit 370 receives the electrical signal, converts the electrical signal into audio data, and then outputs the audio data to the RF circuit 320; to send the audio data to, for example; another mobile phone, or outputs the audio data to the memory 330 for further processing The processor 380 is a control center of the mobile phone 300. The processor 380 is connected to all parts of the entire mobile phone by using various interfaces and lines, and performs various functions of the mobile phone 300 and data processing by running or executing the software program and/or the module stored in the memory 330 and invoking data stored in the memory 330, to perform overall monitoring on the mobile phone. Optionally, the processor 380 may include one or more processing units. Optionally, the processor 380 may integrate an application processor and a modem processor. The application processor mainly processes an operating system, a user interface, an application, and the like. The modem processor mainly processes wireless communication. It can be understood that the modem processor may alternatively not be integrated into the processor 380.

The mobile phone 300 further includes the power supply 390 (for example, a battery) that supplies power to each component. Optionally, the power supply may be logically connected to the processor 380 by using a power management system, to implement functions such as charging and discharging management and power consumption management by using the power management system.

Although not shown, the mobile phone 300 may further include a wireless fidelity (wireless fidelity, WiFi) module, a Bluetooth module, and the like. Details are not described herein.

In this embodiment of this application, the processor 380 is configured to: obtain an authentication request sent by a third-party application; in response to the authentication request sent by the third-party application, obtain authentication information from the third-party application, where the authentication information includes an authentication mode and first prompt information and determine a display location of a first authentication window based on a location of an authentication component corresponding to the authentication mode and the authentication mode, where the authentication component is configured to collect biological information of a user.

The display unit 350, that is, a display, is configured to display the first authentication window at the display location, where the first authentication window displays the first prompt information.

After determining the display location of the first authentication window, the processor may indicate the display unit to perform corresponding display. Alternatively, after the processor determines the display location of the first authentication window, the processor may update specific content in a display content memory, and the display unit displays the content. Specifically, the content that may be displayed by the display unit is text, a character, a pattern, or any combination thereof.

In this embodiment of this application, the processor 380 is specifically configured to determine the display location of the first authentication window based on the authentication mode and a preset correspondence, where the correspondence includes a relationship between the location of the authentication component corresponding to the authentication mode and the display location of the first authentication window.

Further, the processor 380 is further configured to:
detect whether a second authentication window popped up by the third-party application is displayed on a display screen of the terminal; and
if the second authentication window popped up by the third-party application is displayed on the display screen, adjust the location and/or a size of the first authentication window, so that the adjusted first authentication window blocks the second authentication window.

The processor 380 is further configured to:
detect whether a third authentication window popped up by the third-party application is displayed on a display screen of the terminal; and
if the third authentication window popped up by the third-party application is displayed on the display screen, perform weakening processing on the third authentication window, where the weakening processing includes mask adding processing or fuzzy processing.

Further, the processor is configured to determine to send a notification message to the third-party application, where the notification message is used to notify the third-party application to forbid pop-up of an authentication window.

The processor 380 is further configured to dynamically adjust the size of the first authentication window based on the authentication content.

The processor 380 is further configured to:
determine whether the first authentication window blocks other display information on the display screen than an authentication window popped up by the third-party application; and
if the first authentication window blocks the other display information, display the other blocked display information in a display area other than the first authentication window.

The processor is further configured to receive the biological information of the user that is collected by the authentication component.

The processor 380 is further configured to perform authentication on the biological information.

The processor 380 is further configured to: if the authentication fails, display second prompt information in the first authentication window, where the second prompt information is used to prompt the user to enter the biological information again.

The processor 380 is further configured to: if the authentication succeeds, determine to jump to an operation screen of the third-party application; and indicate the display to perform corresponding screen jump display.

This application further provides an apparatus embodiment. Specifically, a terminal is provided, and the terminal includes a processor, a memory, a bus, and a communications interface. The memory is configured to store a computer-executable instruction. The processor is connected to the memory by using the bus. When the terminal runs, the processor executes the computer-executable instruction stored in the memory, so that the terminal performs the methods recorded in the foregoing method embodiments.

The terminal provided in this embodiment of this application may execute the foregoing corresponding method embodiment. Implementation principles and technical effects are similar, and are not described herein again.

This application further provides a storage medium, including a readable storage medium and a computer program. The computer program is used to implement the authentication window display method provided in any one of the foregoing embodiments.

This application further provides a program product. The program product includes a computer program (that is, an executable instruction), and the computer program is stored in a readable storage medium. At least one processor of a terminal may read the computer program from the readable storage medium, and the at least one processor executes the computer program, so that the terminal implements the authentication window display method provided in the foregoing implementations.

An embodiment of this application further provides an authentication window display apparatus, including at least one storage element and at least one processing element. The at least one storage element is configured to store a program. When the program is executed, the authentication window display apparatus is enabled to perform an operation of the terminal in any one of the foregoing embodiments. The apparatus may be a chip in the terminal. The chip mentioned in this application document is an integrated circuit. Specifically, the chip may be a single universal chip, an ASIC, a programmable chip such as an FPGA, a combination of a plurality of chips, a system-on-a-chip SOC, or the like, and a specific physical device form thereof is not limited in this application.

All or some of the steps of the foregoing method embodiments may be implemented by a program instructing related hardware. The foregoing program may be stored in a readable memory. When the program is executed, the steps of the method embodiments are performed. The foregoing memory (storage medium) includes a read-only memory (English: read-only memory, ROM for short), a RAM, a flash memory, a hard disk, a solid-state drive, a magnetic tape (English: magnetic tape), a floppy disk (English: floppy disk), an optical disc (English: optical disc), and any combination thereof.

What is claimed is:

1. An authentication window display method implemented by a terminal, wherein the authentication window display method comprises:
    detecting an authentication request from a third-party application;
    obtaining, responsive to detecting the authentication request and from the third-party application, authentication information comprising first prompt information and indicating a first authentication mode of a plurality of authentication modes;
    selecting, responsive to the authentication request indicating the first authentication mode, a first authentication component for performing authentication, wherein the first authentication component is one of a plurality of authentication components of the terminal respectively corresponding to the plurality of authentication modes, and wherein each of the authentication components is configured to collect biometric information of a user;
    generating a first authentication window including the first prompt information, wherein content of the first prompt information comprises information for prompting the user how to perform the authentication;
    setting, based on selecting the first authentication component, a display location of the first authentication window;
    displaying, on a display screen of the terminal, the first authentication window at the display location; and
    sending a notification message to the third-party application, wherein the notification message notifies the third-party application to forbid pop-up of an authentication window.

2. The authentication window display method of claim 1, further comprising:
    detecting whether a second authentication window popped up by the third-party application is displayed on the display screen; and
    adjusting at least one of the display location or a size of the first authentication window such that the first authentication window blocks the second authentication window to be non-visible when the second authentication window popped up by the third-party application is displayed on the display screen.

3. The authentication window display method of claim 1, further comprising:
    detecting whether a second authentication window popped up by the third-party application is displayed on the display screen; and
    performing weakening processing on the second authentication window when the second authentication window is displayed on the display screen, wherein the weakening processing comprises mask-adding processing or fuzzy processing.

4. The authentication window display method of claim 1, further comprising:
    detecting whether a second authentication window popped up by the third-party application is displayed on the display screen; and
    adjusting a size of the first authentication window such that the first authentication window blocks the second authentication window to be non-visible when the second authentication window popped up by the third-party application is displayed on the display screen.

5. The authentication window display method of claim 1, wherein after displaying the first authentication window at the display location, the authentication window display method further comprises:
    determining whether the first authentication window blocks display information on the display screen other than an authentication window popped up by the third-party application; and
    displaying the display information in a display area other than the first authentication window when the first authentication window blocks the display information.

6. The authentication window display method of claim 1, wherein after displaying the first authentication window at the display location, the authentication window display method further comprises:
    collecting, by the first authentication component, the biometric information of the user; and
    performing authentication using the biometric information.

7. The authentication window display method of claim 6, further comprising jumping to an operation screen of the third-party application when the authentication succeeds.

8. The authentication window display method of claim 6, further comprising displaying second prompt information in the first authentication window when the authentication fails, wherein the second prompt information prompts the user that the authentication fails or prompts the user to enter the biometric information again.

9. A terminal, comprising:
a display screen;
a third-party application;
a plurality of authentication components respectively corresponding to a plurality of authentication modes, wherein each of the authentication components is configured to collect biometric information of a user; and
a processor coupled to the plurality of authentication components and the display screen, wherein the processor is configured to:
detect an authentication request from the third-party application;
obtain, responsive to detecting the authentication request and from the third-party application, authentication information comprising first prompt information and indicating a first authentication mode of the authentication modes;
select, responsive to the authentication request indicating the first authentication mode, a first authentication component of the plurality of authentication components for performing authentication;
generate a first authentication window including the first prompt information, wherein content of the first prompt information comprises information for prompting the user how to perform the authentication;
set, based on selecting the first authentication component, a display location of the first authentication window; and
send a notification message to the third-party application, wherein the notification message notifies the third-party application to forbid pop-up of an authentication window, and
wherein the display screen is configured to display the first authentication window at the display location.

10. The terminal of claim 9, wherein the processor is further configured to:
detect whether a second authentication window popped up by the third-party application is displayed on the display screen; and
adjust at least one of the display location or a size of the first authentication window such that the first authentication window blocks the second authentication window to be non-visible when the second authentication window popped up by the third-party application is displayed on the display screen.

11. The terminal of claim 9, wherein the processor is further configured to:
determine whether a second authentication window popped up by the third-party application is displayed on the display screen; and
perform weakening processing on the second authentication window when the second authentication window is displayed on the display screen, wherein the weakening processing includes mask-adding processing or fuzzy processing.

12. The terminal of claim 9, wherein the processor is further configured to:
detect whether a second authentication window popped up by the third-party application is displayed on the display screen; and
adjust a size of the first authentication window such that the first authentication window blocks the second authentication window to be non-visible when the second authentication window popped up by the third-party application is displayed on the display screen.

13. The terminal of claim 9, wherein the processor is further configured to:
determine whether the first authentication window blocks display information on the display screen other than an authentication window popped up by the third-party application; and
display the display information in a display area other than the first authentication window when the first authentication window blocks the display information.

14. The terminal of claim 9, wherein the processor is further configured to:
receive the biometric information of the user that is collected by the first authentication component; and
perform authentication using the biometric information.

15. The terminal of claim 14, wherein the processor is further configured to display second prompt information in the first authentication window when the authentication fails, wherein the second prompt information prompts the user that the authentication fails or prompts the user to enter the biometric information again.

16. The terminal of claim 14, wherein the processor is further configured to jump to an operation screen of the third-party application when the authentication succeeds.

17. A non-transitory computer-readable storage medium storing a computer program code that when executed by a terminal comprising a processor, a display screen, a plurality of authentication components respectively corresponding to a plurality of authentication modes and configured to collect biometric information of a user, and a third-party application, causes the terminal to:
detect an authentication request from the third-party application;
obtain, responsive to detecting the authentication request and from the third-party application, authentication information comprising first prompt information and indicating a first authentication mode of the authentication modes;
select, responsive to the authentication request indicating the first authentication mode, a first authentication component of the plurality of authentication components for performing authentication;
generate a first authentication window including the first prompt information, wherein content of the first prompt information comprises information for prompting the user how to perform the authentication;
determine, based on selecting the first authentication component, a display location of the first authentication window;
display, on the display screen, the first authentication window at the display location; and
send a notification message to the third-party application, wherein the notification message notifies the third-party application to forbid pop-up of an authentication window.

18. The non-transitory computer-readable storage medium of claim 17, wherein when executed by the terminal, the computer program code further causes the terminal to:
detect whether a second authentication window popped up by the third-party application is displayed on the display screen; and
adjust at least one of the display location or a size of the first authentication window such that the first authentication window blocks the second authentication window to be non-visible when the second authentication window popped up by the third-party application is displayed on the display screen.

19. The non-transitory computer-readable storage medium of claim 17, wherein when executed by the terminal, the computer program code further causes the terminal to:
- detect whether a second authentication window popped up by the third-party application is displayed on the display screen; and
- perform weakening processing on the second authentication window when the second authentication window is displayed on the display screen, wherein the weakening processing comprises mask-adding processing or fuzzy processing.

20. The non-transitory computer-readable storage medium of claim 17, wherein when executed by the terminal, the computer program code further causes the terminal to:
- detect whether a second authentication window popped up by the third-party application is displayed on the display screen; and
- adjust a size of the first authentication window such that the first authentication window blocks the second authentication window to be non-visible when the second authentication window popped up by the third-party application is displayed on the display screen.

* * * * *